(12) United States Patent
Strolego et al.

(10) Patent No.: US 12,269,088 B2
(45) Date of Patent: Apr. 8, 2025

(54) MEASURING SENSOR, SYSTEM AND METHOD AND CASTING MACHINE

(71) Applicant: ERGOLINES LAB S.R.L., Trieste (IT)

(72) Inventors: Sabrina Strolego, Trieste (IT); Stefano De Monte, Trieste (IT); Stefano Spagnul, Trieste (IT)

(*) Notice: Subject to any disclaimer, the term of this patent is extended or adjusted under 35 U.S.C. 154(b) by 0 days.

(21) Appl. No.: 18/258,362

(22) PCT Filed: Jul. 29, 2021

(86) PCT No.: PCT/EP2021/000088
§ 371 (c)(1),
(2) Date: Jun. 20, 2023

(87) PCT Pub. No.: WO2022/042869
PCT Pub. Date: Mar. 3, 2022

(65) Prior Publication Data
US 2024/0189891 A1  Jun. 13, 2024

(30) Foreign Application Priority Data

Aug. 28, 2020  (IT) .................. 102020000020620

(51) Int. Cl.
*B22D 2/00* (2006.01)
*B22D 11/18* (2006.01)
(Continued)

(52) U.S. Cl.
CPC ............ *B22D 11/182* (2013.01); *B22D 2/003* (2013.01); *B22D 2/006* (2013.01); *B22D 11/202* (2013.01); *G01F 23/2962* (2013.01); *G01K 11/24* (2013.01)

(58) Field of Classification Search
CPC .......... B22D 2/00; B22D 2/003; B22D 2/006; B22D 11/18; B22D 11/182; B22D 11/20; B22D 11/202; G01F 23/2962; G01K 11/24
(Continued)

(56) References Cited

U.S. PATENT DOCUMENTS 3,456,715 A  7/1969 Freedman
4,320,659 A  3/1982 Lynnworth
(Continued)

FOREIGN PATENT DOCUMENTS

CA      2310764 A1    12/2000
CN      105397043 A *  3/2016  ........... B22D 11/053
(Continued)

OTHER PUBLICATIONS

Machine translation of CN 105397043 A (Year: 2016).*
(Continued)

*Primary Examiner* — Kevin P Kerns
(74) *Attorney, Agent, or Firm* — Egbert, McDaniel & Swartz, PLLC

(57) ABSTRACT

A system of detection of a temperature of a crystallizer or a level of liquid metal in the crystallizer has a sensor positioned within a mould of the crystallizer. The sensor has a case, a closing cover positioned at a detection face of the case, a plurality of ultrasonic elements arranged in vertically spaced relation to a length of the case, and a plurality of attenuation elements positioned sideways with respect to the closing cover. The plurality of ultrasonic elements include a first ultrasonic element, a second ultrasonic element, and a third ultrasonic element positioned in orthogonal relation to the length of the sensor. The plurality of ultrasonic elements transmit and receive ultrasonic waves.

9 Claims, 10 Drawing Sheets

(51) Int. Cl.
  *B22D 11/20* (2006.01)
  *G01F 23/2962* (2022.01)
  *G01K 11/24* (2006.01)

(58) Field of Classification Search
  USPC .............................. 164/151.2, 151.3, 151.4
  See application file for complete search history.

(56) References Cited

U.S. PATENT DOCUMENTS

| | | |
|---|---|---|
| 5,159,838 A | 11/1992 | Lynnworth |
| 6,631,639 B1 | 10/2003 | Dam |
| 2012/0085164 A1 | 4/2012 | Roehrig |
| 2018/0021849 A1 | 1/2018 | De Monte |

FOREIGN PATENT DOCUMENTS

| | | |
|---|---|---|
| EP | 2409795 A1 | 1/2012 |
| FR | 2323988 A1 | 4/1977 |
| JP | S57159251 A | 10/1982 |
| JP | H10185654 A | 7/1998 |
| WO | 2005/037461 A1 | 4/2005 |

OTHER PUBLICATIONS

International Search Report for corresponding PCT/EP2021/000088 dated Oct. 9, 2021.
Written Opinion of the International Searching Authority for corresponding PCT/EP2021/000088 dated Oct. 9, 2021.

* cited by examiner

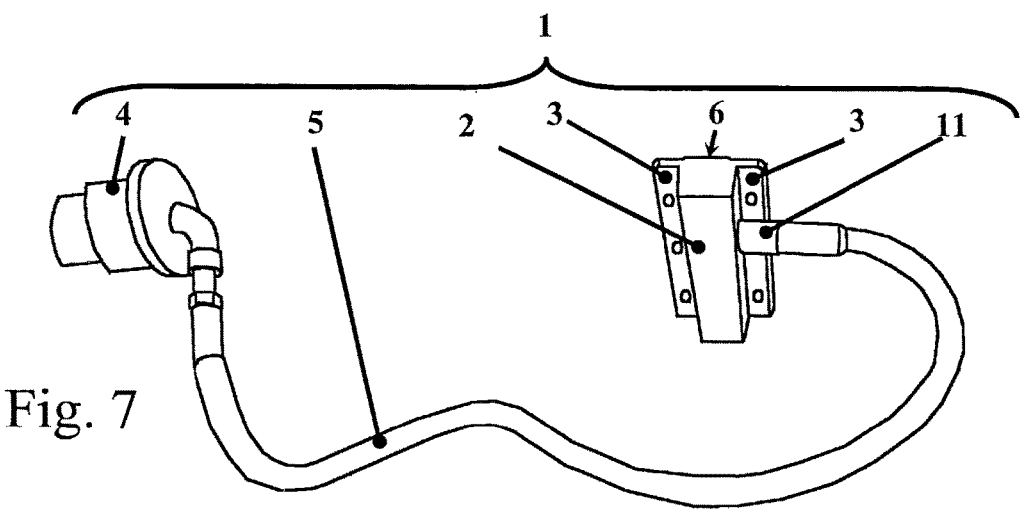
Fig. 7
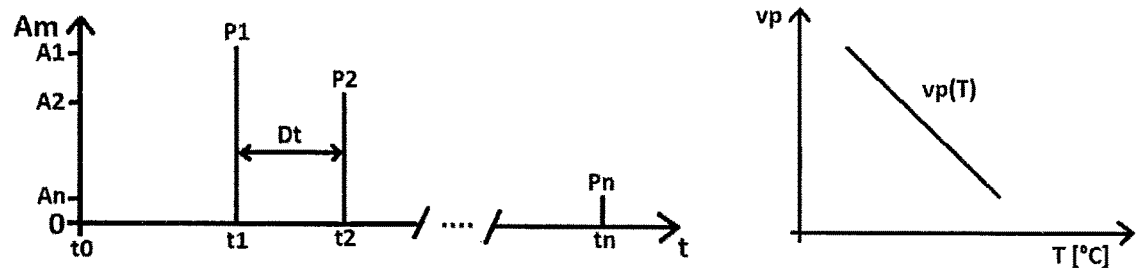
Fig. 8
Fig. 9
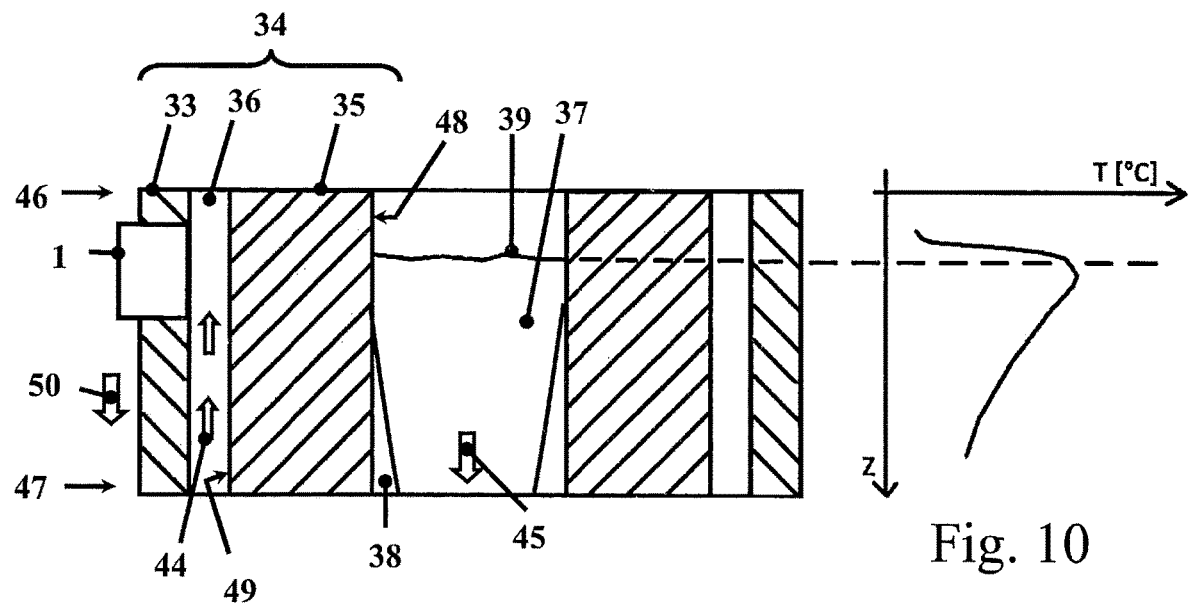
Fig. 10

MEASURING SENSOR, SYSTEM AND METHOD AND CASTING MACHINE

TECHNICAL FIELD

The present invention relates to a sensor, a system and a method for measuring at least one physical quantity in a mould for casting a molten metal. The present invention also refers to a casting machine provided with such a sensor or system.

Definitions

In the present description and in the appended claims, the following terms must be understood according to the definitions given below.

The terms "upper", "at the upper part", "lower", "at the lower part" must be understood as referring to the direction of gravity.

In the present invention, the term "liquid metal" is meant to include both pure metals and metal alloys in the liquid state which are at a temperature at least equal to the one of their melting point.

In the present invention, the term "ultrasound" means an elastic wave having a frequency higher than 0.5 MHz and lower than 5 MHz.

PRIOR ART

In the field of production of steel or, in general, of metals and metal alloys, an essential role is played by continuous casting machines. Continuous casting is a production process which allows the production of steelwork semi-finished products called billets, blooms, slabs according to their size and shape. The production of the semi-finished products occurs starting from the metal or metal alloy in the molten state, which are cast into a mould cooled by means of a cooling fluid which flows in an opposite direction with respect to the advancement direction of the metal semi-finished product, which is formed progressively within the volume of the mould. The mould can be arranged according to a vertical or semi-horizontal arrangement. The mould is open at its lower end, from which the semi-finished product being formed comes out. The mould is open at its upper end, from which the liquid metal enters and progressively begins to solidify within the mould, to be then extracted from the lower end of the mould. The process is stationary, in the sense that in the unit of time, a quantity of at least partially solidified metal comes out at the lower part of the mould, which corresponds to the quantity of liquid metal which enters the mould itself at the upper part. Once the casting process starts in the casting machine, the level of the liquid metal within the mould must be always kept constant, i.e. the position of the free surface of the liquid metal, i.e. the position of the so-called meniscus, with respect to the internal wall of the mould must be kept constant over time during the process. In order to keep the liquid metal level constant, i.e. to keep the position of the meniscus constant, it is possible to act by increasing or reducing the extraction speed of the semi-finished material being formed inside the mould, or it is possible to act by increasing or reducing the flow of liquid metal which penetrates the mould from its upper end.

In order to obtain a measurement of the position of the meniscus, in such a way as to control the extraction speed, or in such a way as to control the flow of liquid metal which penetrates the mould, there are currently two types of sensors on the market.

The first type of sensors for measuring the level of liquid metal in the mould consists of radioactive sensors based on a source of radioactivity placed on a first side of the mould and a scintillator placed on a second side of the mould opposite with respect to the first side. The scintillator picks up a quantity of radiation which depends on the position of the meniscus of the liquid metal which is between the radioactive source and the scintillator itself and from this measurement it is possible to obtain the measurement of the position of the meniscus. The radioactive sensors thus make a sort of X-ray of the mould in correspondence with the meniscus of the steel and allow to determine the position of the meniscus with a degree of accuracy of about 1 mm.

The second type of sensors for measuring the level of liquid metal in the mould is made up of electromagnetic sensors. Electromagnetic sensors are based on the emission of an electromagnetic field in correspondence with the crystallizer wall which contains the liquid metal inside. The electromagnetic field generated produces eddy currents on the crystallizer, whose electromagnetic field generated is in turn picked up by reception coils of the sensor itself. Eddy currents depend on the conductivity of the crystallizer in the zone of generation of the eddy currents themselves and the conductivity in turn depends on the temperature of the crystallizer in the zone of generation of the eddy current and, consequently, it indirectly depends on the position of the meniscus of the liquid metal, whose heat is absorbed by the cooling fluid through the crystallizer itself.

Furthermore, systems are also known for measuring the temperature of the crystallizer wall based on the insertion of thermocouples within the thickness of the crystallizer itself. Measurement of the crystallizer wall temperature at different points allows to obtain a mapping of the temperature of the crystallizer wall. By monitoring the temperature of the crystallizer wall it is possible to obtain alarm signals for the prevention of undesirable phenomena such as breakout of the partially solidified metal which is extracted from the mould or such as the localized adhesion (sticking) of the liquid metal on the crystallizer wall. Starting from the thermal mapping of the crystallizer wall, the identification of the described phenomena takes place according to algorithms which are considered known for the purposes of the present invention.

Patent application JP H10 185654 describes a method for detecting the liquid level inside a furnace in which the level can be stably detected for a long period of time, without being affected by fluctuations in the gain of a transmission and reception system and in which the fluctuations are caused by the contact force on the furnace wall of a transmission element and a reception element of an elastic wave. An elastic wave transmission element and an elastic wave reception element are arranged on an external wall of the furnace, the circumference of which is covered with a refractory material. An elastic wave is emitted by the elastic wave transmission element in a furnace to detect the level of the molten liquid material on the basis of the signal received by the elastic wave reception element following the emission of the elastic wave. The surface wave propagates on the surface of the external wall of the furnace and the echo reflected from the internal wall of the furnace is received by the elastic wave reception element. The wave amplitude of the reflected echo is corrected on the basis of the wave amplitude of the surface wave and the level is detected on the basis of the wave amplitude of the corrected reflected echo.

Patent application U.S. Pat. No. 3,456,715 describes a system for detecting the level of a substance in a container, for example an oscillating mould of a continuous casting machine. The system transmits acoustic energy through the container to generate a signal representative of the substance at a reference level. A second electrical signal is sensitive to the oscillation of the container and represents its displacement with respect to a reference position. The combination of the first and second signals provides an output signal indicative of the substance level. An electro-acoustic transducer means is arranged in such a way as to transmit acoustic energy through a coolant which flows continuously between the transducer means and the wall of a mould or container containing the material whose level is to be measured. When the level of a substance reaches the level at which the transducer is located, an electrical signal develops which has a characteristic which indicates the presence of the material at that level. In a preferred embodiment, the electroacoustic transducer includes a transmitter and a receiver arranged on opposite sides of the mould or container and the transmitter and receiver are suitable for generating an electrical signal in response to the detection of acoustic energy transmitted through the space occupied by the material, that is, through the material itself. The signal transmission occurs in an orthogonal direction with respect to the wall of the mould or container. In an alternative embodiment, a single ultrasonic device is installed which acts as a transmitter in some time periods and as a receiver in other time periods and also in this case the signal transmission takes place in an orthogonal direction with respect to the wall of the mould or container, so that the only ultrasonic device is able to receive the echo of the signal transmitted along the same orthogonal axial direction with respect to the wall of the mould or container.

Patent application CA 2 310 764 describes a method for continuous measurement of the level within a container, according to which a sequence of Lamb wave pulses is transmitted on the container wall by means of a Lamb wave excitor arranged on it and is received by a Lamb wave receiver which is arranged on the container wall at a distance from the Lamb wave excitor. The system determines the propagation time difference between the excitor and the receiver as the difference between the propagation time when the container is empty and the propagation time when in the container a certain level is present. From the difference between the propagation times the position is derived of the current level within the container which is directly proportional to the difference between the propagation times. Since there is a variation in the propagation time of the Lamb waves when a different material comes into contact with the wall of the container, the method allows for a continuous monitoring of the level within the containers.

Patent application U.S. Pat. No. 4,320,659 describes an ultrasonic system which measures either the impedance of a fluid or the liquid level using transverse-mode moderately directional sound waves generated by a transducer which propagate in a homogeneous, flaw-free solid medium. The transverse wave propagates in the solid along a zigzag path which reflects in correspondence with a solid-liquid interface in at least two areas at an angle of incidence which is greater than the first critical angle by at least five degrees and is smaller than the second critical angle by at least ten degrees. The attenuated amplitude of the wave due to acoustic coupling between the solid and the fluid is a measure of the impedance of the fluid or of an impedance related parameter of the fluid. The system preferably includes a second acoustic path which serves as a reference to compensate for changes in parameters such as temperature, the nature of the fluid, the transducer, the transducer coupling, residues or corrosion in correspondence with the solid-liquid interface. In a different embodiment, the reference mechanism is a series of reflections coming from notches in the solid medium. For making the liquid level measurement desensitized to variations in the liquid impedance, the solid is an elongated element which is oriented at an oblique angle, or it is parallel to the surface of the liquid. Other liquid level measurement systems utilize multiple receivers or reflectors located at the points of reflection of the zigzag waves.

Patent application US 2012/085164 describes a support and housing for fluid meter components, including transducers, which is directly coupled to fixation points on a pipe external circumference without external straps. The support may be selectively coupled and decoupled from the pipe fixation points. One or more supports and housings may be arrayed on a pipe exterior in modular way, for different metering applications. Similarly, the support and housing interior may be optionally reconfigurable in modular way for orientation and alignment of one or a plurality of transducers or other components for different user applications, without the need for auxiliary alignment tools, templates, measuring instruments or other devices.

Patent application U.S. Pat. No. 6,631,639 describes a non-invasive system and method for measuring the liquid level in a container using a pair of ultrasonic transducers mounted spaced apart, externally on the container wall. One of the transducers produces a single pulse of sonic energy which produces a flexural or elastic wave in the wall and the second transducer receives the flexural wave to produce an electrical waveform signal corresponding to the travel time of the flexural wave between the two transducers. The electrical waveform signals generated at different times are compared to determine if a phase shift exists between the two waveform signals. The phase shift indicates that there has been a change in the liquid level condition in the interior space of the container between the two transducers. Measuring the phase delay, or time delay between the flexural wave components produced at two different times is used to indicate presence or absence of the liquid at a point of the container or the height of the liquid in the interior space of the container.

Patent application WO 2005/037461 describes a method for the identification of steel breakout events in an ingot mould, so as to avoid that damage inside the ingot mould, at the skin or the solidified external layer of the steel bath causes leaks of molten steel on the underlying rollers when the ingot comes out of the mould, thereby causing the entire plant to stop. A high-frequency mechanical oscillation is generated on the external surface and on the internal surface of the ingot mould, so as to give rise to so-called surface or Rayleigh-type waves, and an analysis is made of how such oscillation is absorbed by the surface of the material being in permanent contact with the ingot mould. Should the size or extension of this surface vary following the breakdown of the solidified external layer, there occurs an abrupt increase in the contact with the copper walls and, as a result, an immediate variation of the acoustic impedance of the copper surface of the ingot mould.

Patent application FR 2 323 988 describes a system for measuring the level in a mould of a continuous casting machine in which pulses of ultrasonic waves are caused to propagate exclusively along the internal surface of the wall of the container towards the liquid and are partially reflected by the discontinuity represented by the liquid in contact with the surface of the wall. The reflected wave is detected and the time interval is measured which separates the generated pulse from the detected ultrasonic wave. The value of the interval represents the position of the discontinuity with respect to a pre-set reference level for the liquid.

The application US 2018/021849 describes a measurement sensor in a crystallizer based on the transmission of an ultrasonic signal transmitted towards the crystallizer and a reception phase of an ultrasonic signal reflected by the crystallizer. Transmission occurs in a transmission direction inclined with respect to the crystallizer wall such that the received reflected ultrasonic signal is an ultrasonic signal which has undergone multiple reflections in the crystallizer along a zigzag path. The use is provided of multiple receptions of the same transmission signal at different reflection points of the crystallizer by means of different reception sensors at different vertically spaced points. The ultrasonic elements include ultrasound transmitter and a series of ultrasound receivers. The transmitter does not act as an ultrasonic signal receiver and the receivers do not act as ultrasonic signal transmitters.

Application EP 2 409 795 describes a method for measuring the temperature of an ingot mould for molten metal in which the method involves the transmission of an ultrasonic wave longitudinally and vertically, not transversely, along the development in length of the mould. Wave propagation therefore occurs vertically within the mould in a direction parallel to the surface of the mould adjacent to the molten metal contained. Since there are no elements along the vertical path which could generate a reflection of the ultrasonic wave, whose propagation occurs undisturbed between the copper walls of the mould, the solution provides that transverse holes are obtained on the wall of the mould which form reflection areas for the ultrasonic wave which is thus reflected towards the same transmitter element which, acting as a receiver, detects the reflected ultrasonic wave.

Application JP S57 159251 describes a solution in which ultrasonic elements act alternately as transmitters and receivers with transmission of ultrasonic waves orthogonal with respect to the mould and reception of waves reflected by the walls of the mould. The measurement is based on the detection of the amplitude of the reflected wave at each one of the sensors, which is different in the two cases of wave reflected by the wall of the mould in an area where the mould contains molten steel and in an area where the mould does not contain molten steel. The measurement is based on a comparison of the amplitude of the signals received in different areas of the mould. A second solution provides that on a first side of the mould there are vertically spaced transmitters which transmit to corresponding receivers arranged on the opposite side of the mould, so that the ultrasonic waves transmitted by the transmitters are received by the receivers on the opposite side of the mould after crossing the entire mould according to the transverse direction and, if present in the crossing area, also after passing through the molten steel contained in the mould in the crossing area, a condition which does not occur if the molten steel is instead at a lower level of the line which connects the transmitter on one side and the receiver on the opposite side of the mould. In this case as well the measurement is based on the comparison of the amplitudes of the received signals and on the basis of the principle that the amplitude of the received signal is different in the two cases of crossing of the mould in an area where the molten steel is absent and in an area where the molten steel is present.

Problems of Prior Art

The radioactive sensors have remarkable problems in relation to the handling of the radioactive source and of the materials which are exposed to the radioactive source itself for a long period. Indeed, when the radioactive source is exhausted, it is necessary to adopt very strict safety procedures for its replacement to prevent the operators from being exposed to radiations. Furthermore, there are problems of disposal of the exhausted radioactive source, which must be carried out by specialized firms. Moreover, any possible loss of a radioactive source, which is not a very unlikely event in the operations of replacement of the exhausted sources, implies the immediate seizure of the plant, with the consequent stop of production and huge economic damage.

The electromagnetic sensors, although being a safer alternative from the point of view of the handling with respect to radioactive sensors, are less widespread because they are less accurate, slower in response and usable only for moulds having a thickness of the crystallizer which is not too great, that is generally smaller than 15 mm. Indeed, due to the shielding action of the metal mould, the eddy currents induced by the electromagnetic sensor affect only a layer of about 1 mm of the total thickness of the crystallizer. Said zone affected by the eddy currents is on the opposite side of the crystallizer with respect to the side on which there is the molten metal which is cast. If the thickness of the crystallizer is great, that is greater than 15 mm, the measurement of the electromagnetic sensor is affected by a delay due to the time necessary for the temperature of the crystallizer to change in correspondence of the zone affected by the eddy currents, that is the external side of the crystallizer, following the change in the position of the meniscus in correspondence with the opposite side of the crystallizer itself, that is on the internal side of the crystallizer. Indeed, a variation in the position of the meniscus of the liquid metal on the internal side of the crystallizer produces a temperature change which propagates within the thickness of the crystallizer until reaching the external side of the crystallizer, near which the electromagnetic sensor is placed. The temperature change in the metal material of which the crystallizer is made, that is the difference in temperature between the region of the wall of the crystallizer below the level of the cast liquid metal and the region just above where there is no liquid metal in contact with the crystallizer is maximum on the internal side of the mould where there is the cast liquid metal while it becomes progressively less marked as one approaches the external side of the crystallizer. Furthermore, if the mould is very thick, the difference in temperature in the first millimetre of thickness of the external side of the crystallizer where there are the induced eddy currents is so weak as not to be detectable with an electromagnetic sensor. These sensors are thus used for moulds having a thickness smaller than 15 mm. This limitation excludes their use in the moulds for large formats, which reach copper thicknesses up to 40 mm, making the radioactive sensor the only technology for the control of the level in large formats.

The mapping of the temperature of the mould by means of thermocouples has some drawbacks too, because the thermocouples must be inserted into specific cavities obtained in the thickness of the crystallizer. This method can be applied only in case of great thicknesses of the crystallizer, because the insertion of thermocouples on crystallizers having small thicknesses of the order of 15 mm would weaken the structure of the crystallizer and could also locally jeopardize the efficiency of the cooling of the liquid metal contained in the crystallizer.

AIM OF THE INVENTION

The aim of the present invention is to provide a measuring method and a sensor for measuring at least one physical quantity in a mould which allow accurate and precise measurements.

A further aim of the present invention is to provide a mould provided with this measuring system.

CONCEPT OF THE INVENTION

The aim is achieved by the characteristics of the main claim. The sub-claims represent advantageous solutions.

Advantageous Effects of the Invention

The solution according to the present invention, through the considerable creative contribution the effect of which constitutes an immediate and not negligible technical progress, has various advantages.

The sensor and the inventive method do not use radioactive sources and are based on materials and methods which are not dangerous for health and which do not have disposal problems.

The solution according to the present invention allows to obtain precise measurements also in case of very thick crystallizers.

The solution according to the present invention allows to obtain measurements of the temperature of the crystallizer in different points, without the need to insert thermocouples within the thickness of the crystallizer, allowing such detection also on crystallizers having a small thickness.

The solution according to the present invention allows to operate with a high degree of sensitivity, precision and reliability.

The solution according to the present invention allows to have low installation and management costs of the measuring system.

DESCRIPTION OF THE DRAWINGS

An embodiment solution is described hereinafter with reference to the attached drawings to be considered as a non-limiting example of the present invention in which:

FIG. 7 is a representation of the sensor made according to the present invention.

FIG. 8 is a graph which schematically illustrates the principle of operation.

FIG. 9 is a graph which schematically illustrates a characteristic curve of dependence of the propagation speed of a wave in a material as a function of temperature.

FIG. 10 schematically represents the typical development of the temperature profile in the copper of the crystallizer of a mould in which molten steel is cast according to the distance from the edge of the mould.

DESCRIPTION OF THE INVENTION

Figure 1:
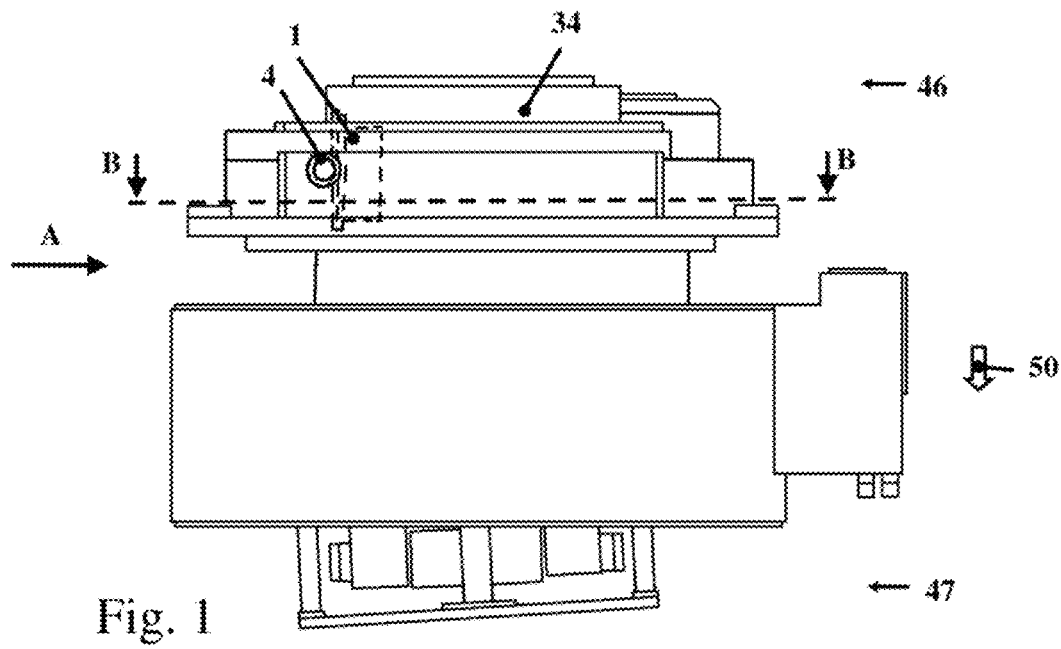
FIG. 1 represents a side view of a mould incorporating the inventive sensor.
Figure 2:
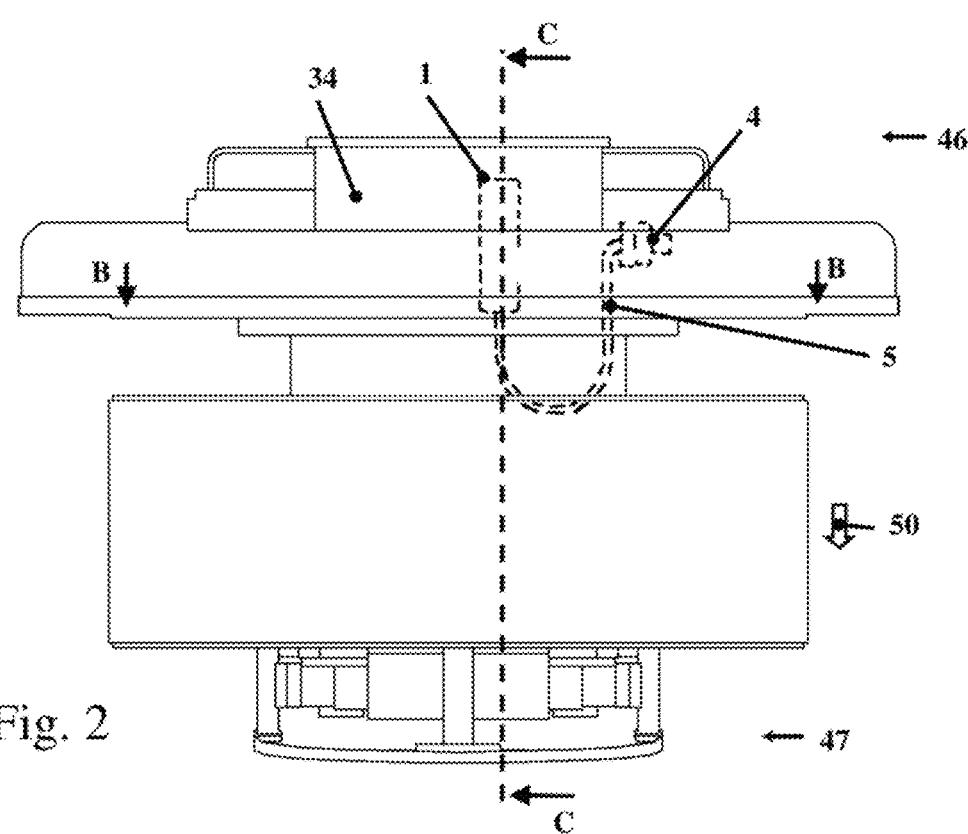
FIG. 2 represents the mould incorporating the inventive sensor of FIG. 1 according to the point of view indicated with A in FIG. 1.
Figure 3:
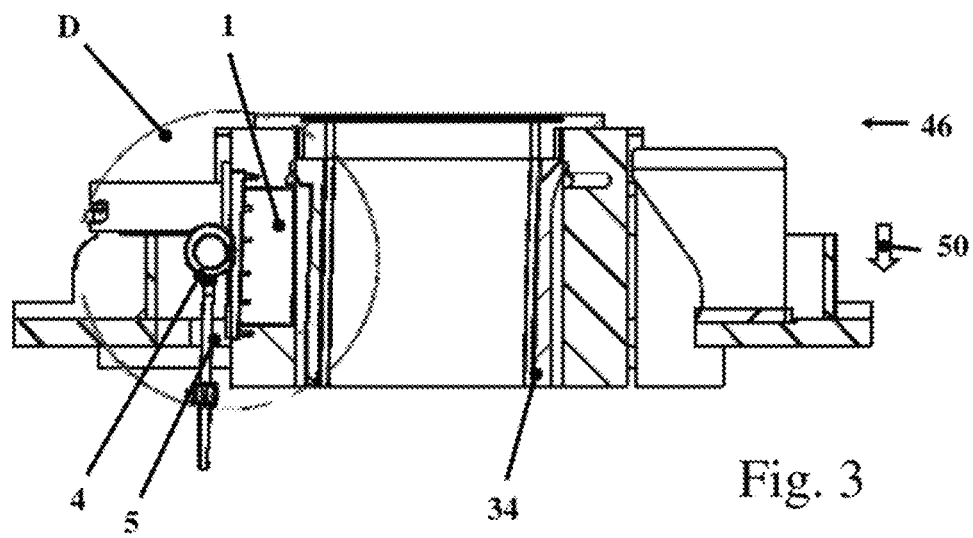
FIG. 3 represents the mould incorporating the inventive sensor of FIG. 2 according to the section line indicated with C-C in FIG. 2.
Figure 4:
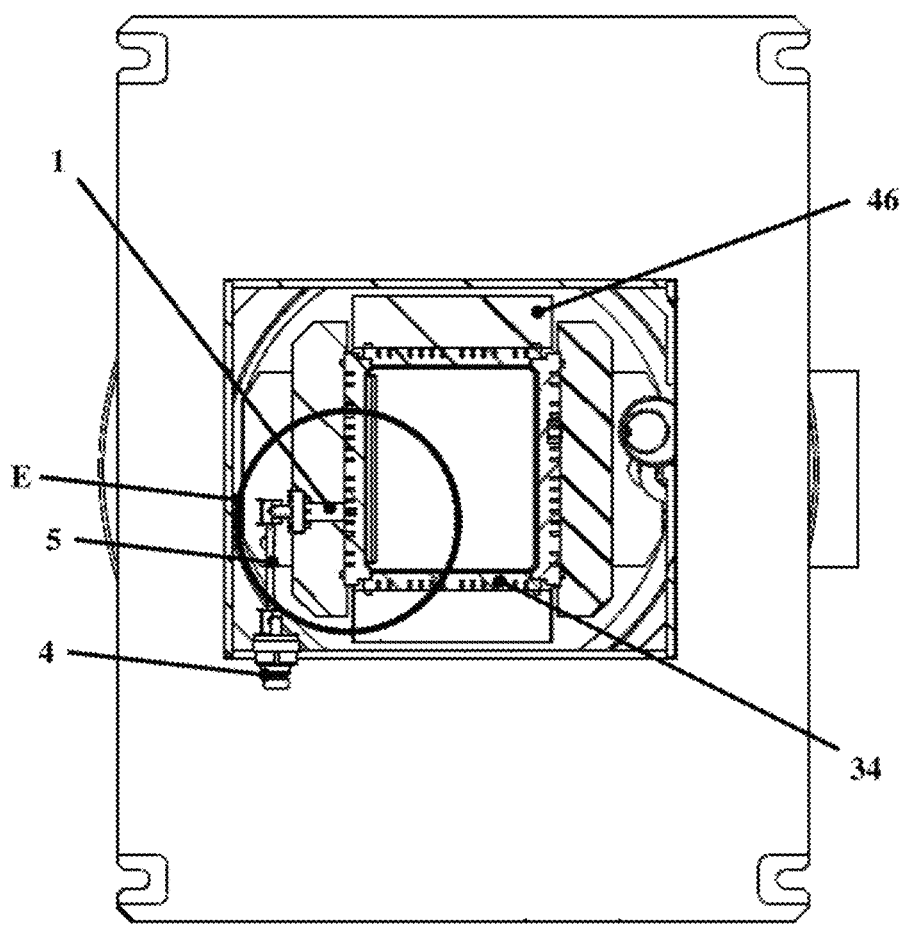
FIG. 4 represents the mould incorporating the inventive sensor of FIG. 1 according to the section line indicated with B-B in FIG. 1.

The present invention relates to a measuring method and a sensor for the measuring of at least one physical quantity in a mould in which the principle of propagation of sound waves is used.

An elastic perturbation wave which propagates in a material medium is characterized by some physical quantities which determine its basic properties. In particular, the propagation speed of the wave in the medium is the essential parameter to describe the propagation time of the wave itself in a given thickness of material. This speed depends in turn on characteristic physical parameters such as density, Young's modulus and Poisson's modulus. It is known that the thermal state of the material affects these quantities and, as a consequence, the speed of the wave depends in turn on the temperature of the medium within which it propagates. If we consider a material having a thickness S having a propagation speed of the compression wave equal to vp and if we inject a sufficiently localized perturbation in a point of the material boundary, the wave propagates inside the material until it reaches the opposite boundary of the material, producing a rebound wave in the opposite direction. Boundary means the interface where the material stops and another material begins, such as a fluid, air, another solid. If the two opposite boundaries are parallel, the process continues until the available energy is exhausted, producing a train of pulses which can be registered at a receiver placed in the wave reception area, for example in the proximity of the same point of injection of the perturbation wave. The amplitude of these pulses, indeed, will decrease as a result of the attenuation of the material itself. For example (FIG. 8), if at an initial instant t0 a perturbation wave is emitted at a point of a first boundary of the material, the wave travels through the material up to a second opposite boundary and a first return wave is generated, which in the first boundary is represented by the peak P1 received at instant t1. Then, the first return wave undergoes in turn a rebound on the first boundary, it retraces the material and a second return wave is generated on the second boundary, which in turn in the first boundary is represented by the peak P2 received at instant t2. The amplitude of the second return wave A2 is smaller than the amplitude of the first return wave A1 due to the attenuation of the material. Proceeding over time, a nth return wave is generated on the second boundary which, in turn, in the first boundary is represented by the peak Pn received at the instant tn, with an amplitude A smaller than the previous return waves. It is known that in such conditions $Dt=(2\times S)/vp$, where Dt represents the temporal distance between two successive peaks in the sequence of peaks P1, P2, P3, P4, P5, . . . . Pn or, in other words, the travel time of an elastic wave including the round trip path.

If a change in temperature T occurs in the material, the time Dt changes due to both the change in the propagation speed vp and the thickness S of the material due to thermal expansion or contraction. If, however, a metal is considered, such as copper, and if a range of temperatures is considered where the behaviour is substantially linear, then the dominant contribution is due only to the variations in the propagation speed vp, the contribution being negligible of the variations in the thickness S of the material due to thermal expansion or contraction. As a consequence, therefore, the propagation speed vp being characterized as a function of the temperature T, for a metal it is possible to obtain an estimate of the temperature T of the material starting from the measurement of the times t1, t2, . . . , tn of arrival of the peaks P1, P2, P3, P4, P5, . . . , Pn. In practice, given the experimental measurement of the propagation speed vp (T)=Dt/(2×S) it will be possible to derive the temperature T from the propagation speed vp (T) once the characteristic curve is known (FIG. 9) of dependence of the propagation speed of a wave in a material as a function of temperature, which can be obtained for example by calibrating the measuring instruments in relation to the material with which the medium is made in which the elastic perturbation wave propagates.

The production of steel or, in general, of metals and metal alloys, takes place by means of continuous casting machines. Continuous casting is a production process which allows the production of semi-finished steelwork products called billets, blooms, slabs according to their size and shape. The production of semi-finished products takes place starting from the metal or metal alloy in the molten state which are cast (FIG. 10) into a mould (34). The mould (34) is arranged according to an essentially vertical arrangement, although solutions are also known in which the mould is installed in an inclined or semi-horizontal position, which are however to be considered solutions included within the scope of the present invention. The mould (34) is open at its lower end (47), from which the semi-finished product being formed comes out. The mould is open at its upper end (46), from which the liquid metal enters which progressively begins to solidify within the mould and is then extracted from the lower end of the mould. The terms "upper" and "lower" must be understood as referring to the direction of gravity (50). The process is stationary in the sense that in the unit of time, a quantity of at least partially solidified metal exits at the lower part of the mould, which corresponds to the quantity of liquid metal which enters the mould itself at the upper part. Once the casting process has started in the casting machine, the level (39) of the liquid metal (37) within the mould (34) must always be kept constant, i.e. the position of the free surface of the liquid metal (37), i.e. the position of the so-called meniscus, with respect to the internal wall of the mould (34) must be kept constant over time during the process. The mould (34) includes a crystal-lizer (35), which is generally made of copper or metal alloy with a high copper content, although the present invention is also applicable in the case of crystallizers (35) made of metallic materials other than copper such as, for example, metal alloys. The crystallizer (35) is cooled by means of a flow of cooling fluid (44), usually water, which flows according to (FIG. 10) a direction of the flow of fluid (44), which is opposite to the direction of the flow of the liquid metal (45) which is cast into the mould (34). When the cast liquid metal passes through the crystallizer (35), it gradually solidifies as it advances from the upper end (46) towards the lower end (47) of the mould (34). When the semi-finished product being formed comes out of the lower end (47) of the mould (34), it is not completely solidified, and has a perimeter shell having the same shape as the crystallizer (35), which is solidified and which is called skin (38). Inside the skin (38), the semi-finished product being formed still contains a central core consisting of metal in the liquid state, which solidifies in the lower part of the casting machine as it advances towards subsequent processing devices, such as, for example, straightening rollers, units for cutting to size, etc.

The cooling of the crystallizer (35) can take place in different ways. In a first solution (FIG. 10), suitable for crystallizers (35) for billets or blooms of smaller dimensions than the maximum castable dimensions, the cooling takes place by directing the flow of cooling fluid (44) previously described on the external wall (49) of the crystallizer (35) within a perimetrically external spacing (36) which surrounds the crystallizer and which is delimited by a conveyor (33). In a second solution, suitable for crystallizers (35) for blooms of large dimensions with respect to the maximum castable size or suitable for casting slabs, the cooling takes place by directing the flow of cooling fluid previously described into cavities of the crystallizer (35) itself or in cavities obtained on the coupling surfaces of assembly elements of the crystallizer itself. The present invention is applicable regardless of the type of mould. In order to keep the level (39) of the liquid metal (37) constant, i.e. to keep the position of the meniscus constant, it is possible to act by increasing or reducing the extraction speed of the semi-finished material being formed inside the mould (34) or it is possible to act by increasing or reducing the flow of liquid metal (37) which enters the mould (34) from its upper end (46). It is therefore important to obtain a measurement of the position of the meniscus, that is of the position of the level (39) of the liquid metal with respect to the essentially vertical or inclined extension of the mould (34), in such a way as to control extraction speed or in such a way as to control the flow of liquid metal (37) penetrating the mould (34). Internal wall (48) of the crystallizer conventionally means the wall of the crystallizer which is in contact with the liquid metal, i.e. the hot side, while external wall (49) of the crystallizer means the wall opposite to the internal wall (48) with reference to the thickness of the crystallizer itself, i.e. the cold side.

Furthermore, it is also important to obtain measurements of the temperature of the internal wall (48) of the crystallizer (35), since, by monitoring the temperature of the internal wall (48) of the crystallizer (35) at different points, it is possible to obtain alarm signals for preventing undesirable phenomena such as breakout of the skin (38) of the partially solidified metal which is extracted from the mould or such as the localized adhesion (sticking) of the liquid metal on the internal wall (48) of the crystallizer (35). Starting from the thermal mapping of the internal wall (48) of the crystallizer (35), the identification of the described phenomena takes place according to algorithms which are considered known for the purposes of the present invention.

Figure 11:
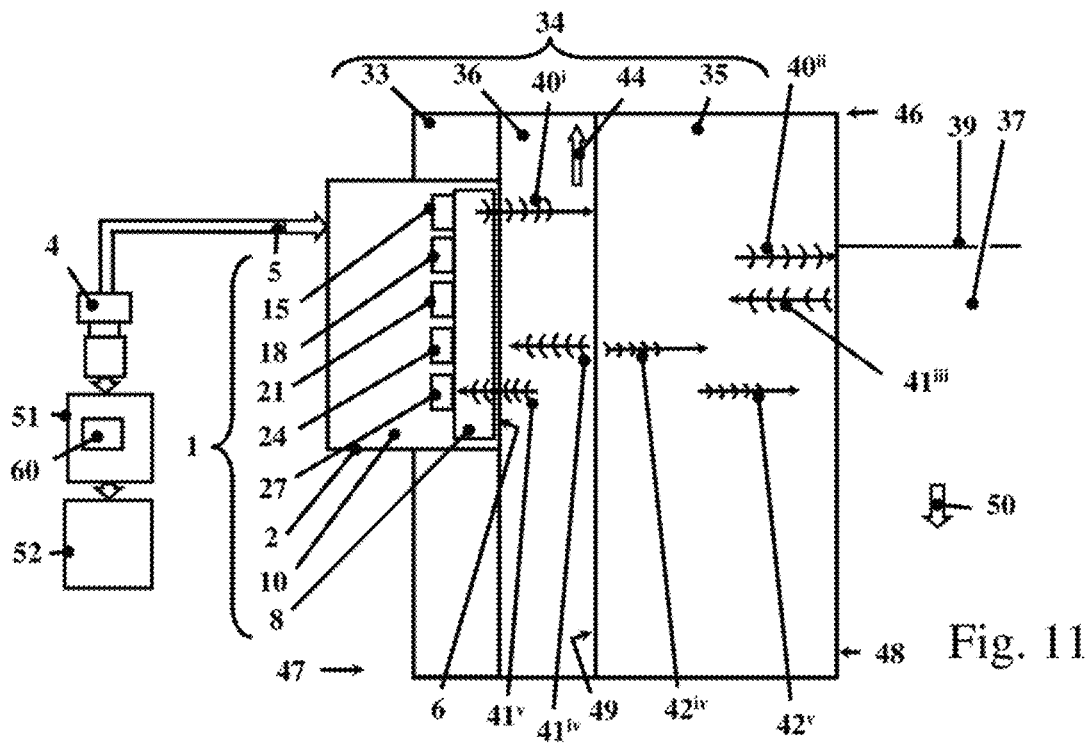
FIG. 11 schematically represents the functioning of the inventive sensor installed on a mould.

It is known that the temperature distribution along the mould (34) within the copper thickness of the crystallizer (35) follows a development (FIG. 10) with a rapid initial spatial variation of temperature increase, followed by a maximum of temperature a few mm below the real position of the level (39) or meniscus and, finally, there is a slow descent of the temperature to the lower end (47) of the mould (34). The inventive sensor (1) exploits this effect that the liquid metal (37) has on the crystallizer (35) of the mould (34). Indeed, the cast liquid metal (37) has a temperature equal to the melting temperature of the metal itself. The casting temperature varies according to the type of metal or metal alloy being cast. For example, for steels the casting temperature may be in the order of 1370-1530° C., for copper the casting temperature may be in the order of 1083° C. In the present invention, the term "liquid metal" will mean to include both pure metals and metal alloys in the liquid state which are at a temperature at least equal to the one of their melting point. When the liquid metal (37) is inside the crystallizer (35), the temperature of the crystallizer (35) has a development according to the curve shown. Also an alteration of the elastic properties of the metal of which the crystallizer (35) is made corresponds, as explained, to the alteration of the temperature of the crystallizer (35) according to the indicated development, with consequent variation of the speed of the elastic waves which are transmitted through the crystallizer itself. By means of the inventive sensor (1) the injection is provided (FIG. 11) of elastic perturbations at regular intervals on the external wall (49) of the crystallizer (35) of the mould (34), with generation of direct acoustic waves, reflected acoustic waves and counter-reflected acoustic waves.

For example, a packet of direct wave ($40^i$) is emitted by a first ultrasonic element (15) of the sensor (1), it passes through a respective support (8) of the sensor (1) and penetrates the cooling fluid continuing and advancing towards the external wall (49) of the crystallizer (35) where the first packet of direct wave (40) penetrates the material of the crystallizer (35) to propagate within it.

For example (FIG. 11), a packet of direct wave ($40^{ii}$) previously emitted by a second ultrasonic element (18) of the sensor (1), after penetrating the material of the crystallizer (35) and after propagating within it, reaches the internal wall (48) where a reflection phenomenon occurs with the generation of a corresponding reflection wave.

For example (FIG. 11), a packet of reflected wave ($41^{iii}$) is generated when a packet of direct wave previously emitted by a third ultrasonic element (21) of the sensor (1) reaches the internal wall (48) and the packet of reflected wave ($41^{iii}$) returns towards the third ultrasonic element (21), again passing through the material of the crystallizer (35) in a direction opposite to the direction of the corresponding direct wave packet.

For example (FIG. 11), a packet of reflected wave (417) (41') corresponding to a packet of direct wave previously emitted by a fourth ultrasonic element (24) of the sensor (1), after passing through the crystallizer material, crosses the external wall (49) to continue towards the fourth ultrasonic element (24), but at the same time also giving rise to the generation of a corresponding counter-reflected wave (42), which retraces the material of the crystallizer towards the internal wall (48).

For example (FIG. 11), a packet of reflected wave ($41^v$) corresponding to a packet of direct wave previously emitted by a fifth ultrasonic element (27) of the sensor (1), after passing through the material of the crystallizer and the external wall (49) passes through the support (8) of the sensor (1) and reaches the fifth ultrasonic element (27) for measuring, while at the same time a corresponding counter-reflected wave ($42^v$) continues its path within the material of the crystallizer towards the internal wall (48) to undergo in turn a new reflection in the opposite direction to go again towards the fifth ultrasonic element (27) for a further measuring.

It will be evident that the same steps described for one of the ultrasonic elements (15, 18, 21, 24, 27) of the sensor (1) take place in sequence for each one of them, although for the sake of brevity each different step has been described with reference to a particular one of ultrasonic elements (15, 18, 21, 24, 27) of the sensor (1).

Since the distance of the path of the elastic waves is known and fixed, by utilizing the dependence of the speed of the elastic waves on the temperature of the material they pass through, according to the described configuration, it is therefore possible, by measuring the travel times of the elastic waves, to obtain the measurement of the temperatures inside the material crossed by the elastic waves.

Figure 12:
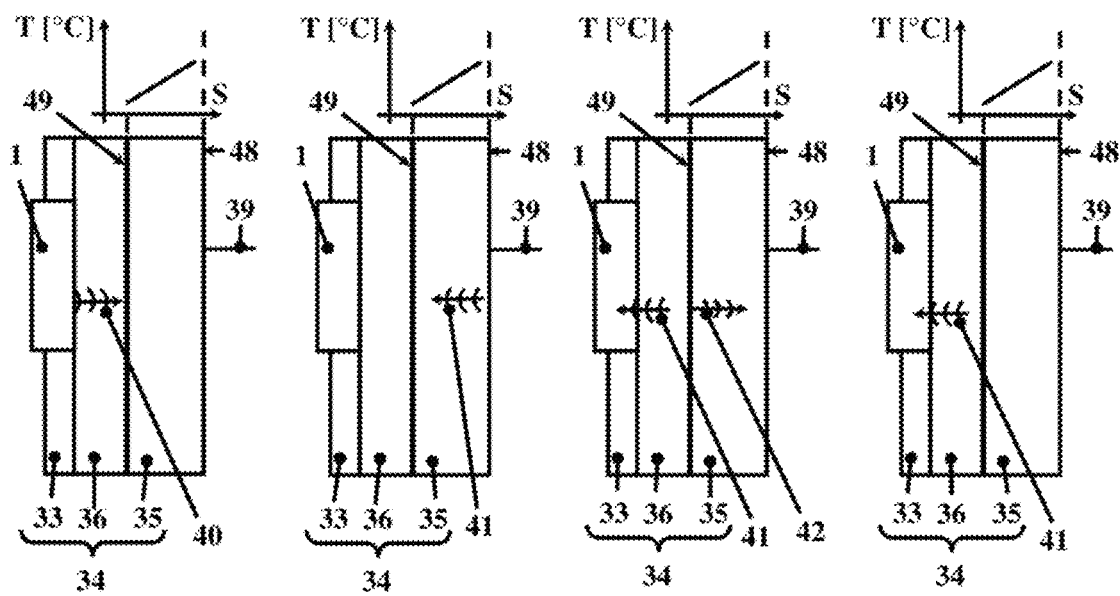
FIG. 12 schematically represents a time sequence relating to the path of an elastic wave and its detection signal.
Figure 12:
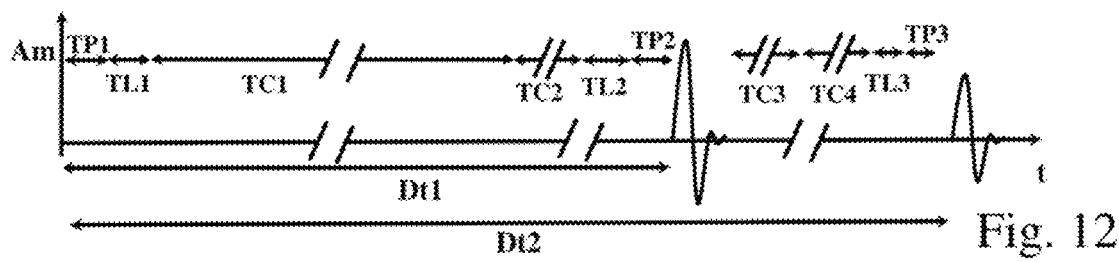

In particular (FIG. 12), it can be considered that the variation is substantially linear of the temperature T along a path S between the hot side corresponding to the internal wall (48) in contact with the molten metal and the cold side corresponding to the external wall (49) in contact with the flow of cooling water (44). Consequently, given a signal injection area, the measurement of the travel time of an elastic wave, including the round trip path, Dt allows to obtain the average temperature of the volume given by this area for the thickness S of the crystallizer (35). The smaller the area of extension and the greater the injection points, the better the measurement will be of the shape of the temperature curve of the crystallizer (35) of copper or copper-based alloys. From the reconstruction of the temperature curve it is then possible to obtain an estimate of the position of the level (39) of steel or meniscus within the mould (34).

To sum up, therefore, the use of elastic or compression or sound waves within a mould (34) provides:
 (a) injection of a perturbation of direct elastic waves (40) into an injection area on the cold wall or external wall (49) of the copper mould (34);
 (b) reading in the same injection area of reflected waves (41) due to the reflection phenomena on the hot wall or internal wall (48) of the crystallizer (35) of the mould (34) made of copper. The first and second reflections coming from the surface 49 (cold copper side) are used to determine an acquisition time window. Indeed, between these two pulses there is the first rebound sequence in the copper;
 (c) reading in the same injection area of additional reflected waves (41) due to the phenomena of counter-reflection of the waves reflected on the cold wall or external wall (49) of the crystallizer (35) of the mould (34) with generation of counter-reflected waves (42), corresponding to one or more successive rebounds of the waves within the thickness of the crystallizer;
 (d) measurement of the travel times of reflected waves and subsequent rebounds within the thickness of the crystallizer (35) of the mould (34);
 (e) conversion of the travel time measurement into a temperature measurement through a characteristic curve of the propagation speed as a function of temperature, the characteristic curve being able to be obtained, for example, by means of a calibration procedure;

(f) execution of points (a) to (e) in different positions along the direction of extraction of the steel from the mould, with obtainment of a temperature distribution curve along the direction of extraction of the steel from the mould;

(g) obtention of a measurement of the position of the steel level (39) within the mould (34) by identifying (FIG. 10) the position of the maximum temperature of the temperature distribution curve along the direction of extraction of the steel from the mould.

Figure 17:
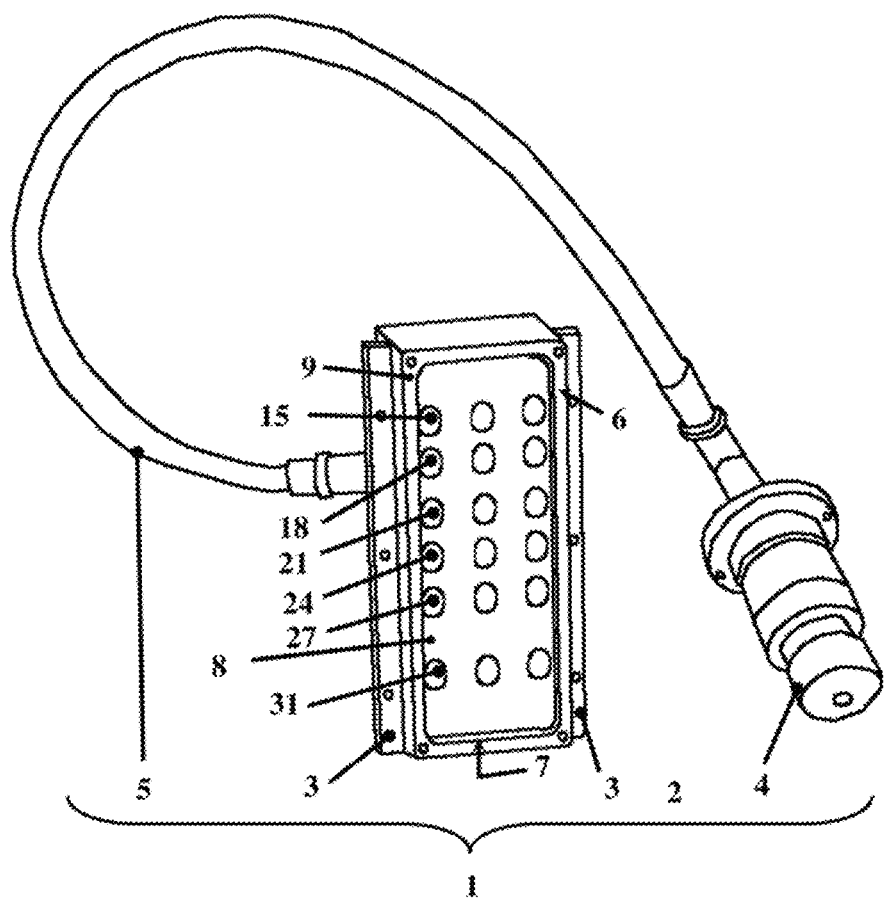
FIG. 17 illustrates a different possible embodiment of the inventive sensor.
Figure 18:
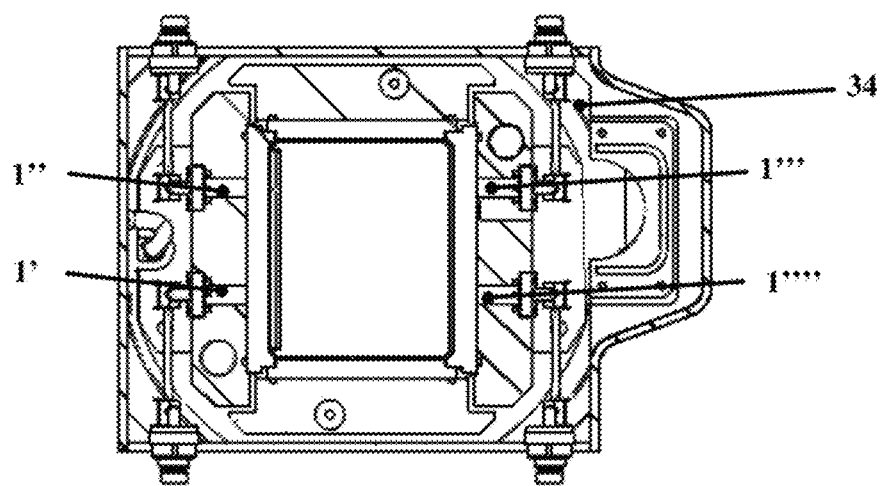
FIG. 18 illustrates a possible embodiment of a thermal mapping system.

Advantageously, the sensor and the method can be used for measuring the position of the level (39) within the mould (34) by executing points (a) to (g) or the sensor and the method can be used for a mapping of the temperature inside the mould (34) by executing points (a) to (e) in different points or areas of interest which can be arranged aligned one after the other along the direction of extraction of the steel from the mould, as well as arranged according to a matrix arrangement (FIG. 17) with ultrasonic elements arranged along rows of elements, in which rows of elements are arranged one after the other along the direction of extraction of the steel from the mould. Alternatively, solutions can be envisaged in which a series (1', 1", 1''', 1'''') of devices (FIG. 18) is arranged in particular areas of the mould to be monitored more carefully.

Since in practice it is convenient to use established industrial components, it is not practical to try to inject a perturbation of elastic waves directly into the crystallizer (35). Instead, it is more advantageous to use a configuration (FIG. 11) in which the ultrasonic element or elements (15, 18, 21, 24, 27) are mounted on a support or cover (8) which is in turn fixed on a containment case (2) thus realizing the sensor (1) together with the respective cable (5) and connector (4). The sensor (1) is mounted on the conveyor (33), which is spaced from the crystallizer due to the presence of the spacing (36) within which the water flow (44) flows. The advantage of this application is that the water normally used for the external cooling of the copper mould can be used to achieve the acoustic coupling.

Figure 5:
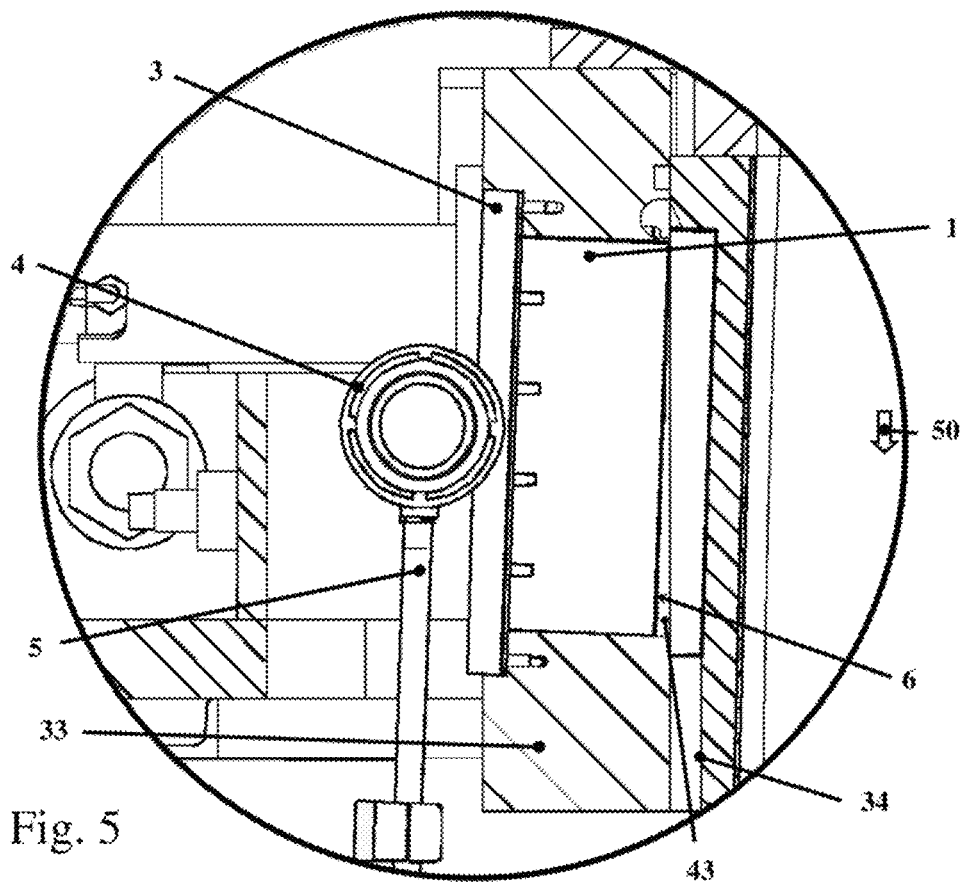
FIG. 5 is an enlargement of the portion indicated with D in FIG. 3.
Figure 6:
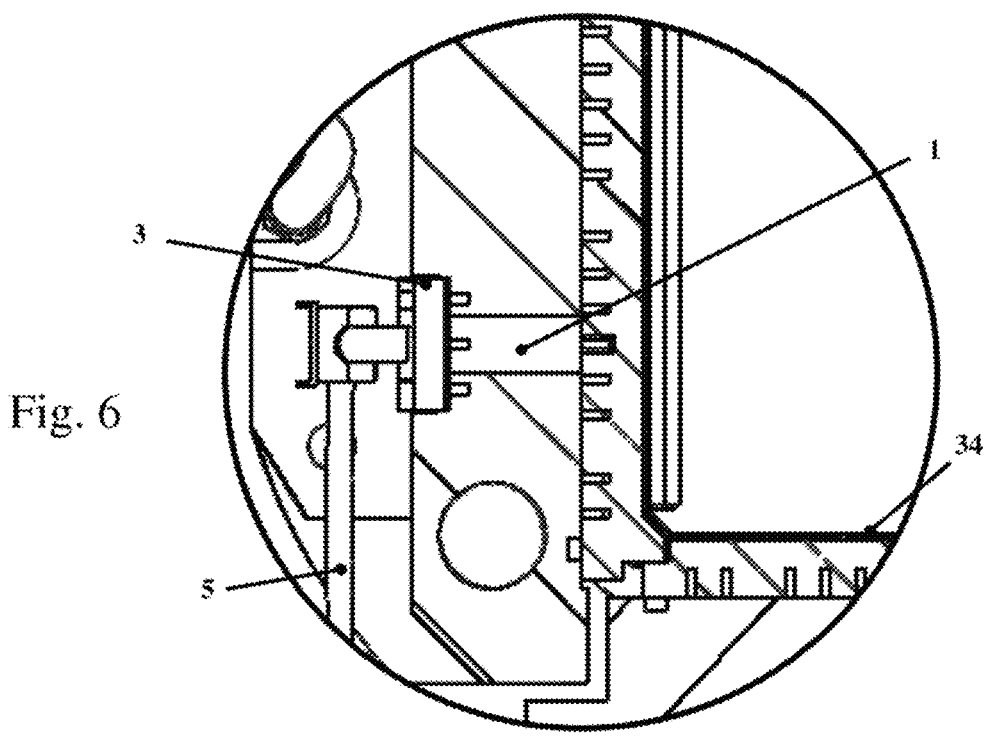
FIG. 6 is an enlargement of the portion indicated with E in FIG. 4.
Figure 13:
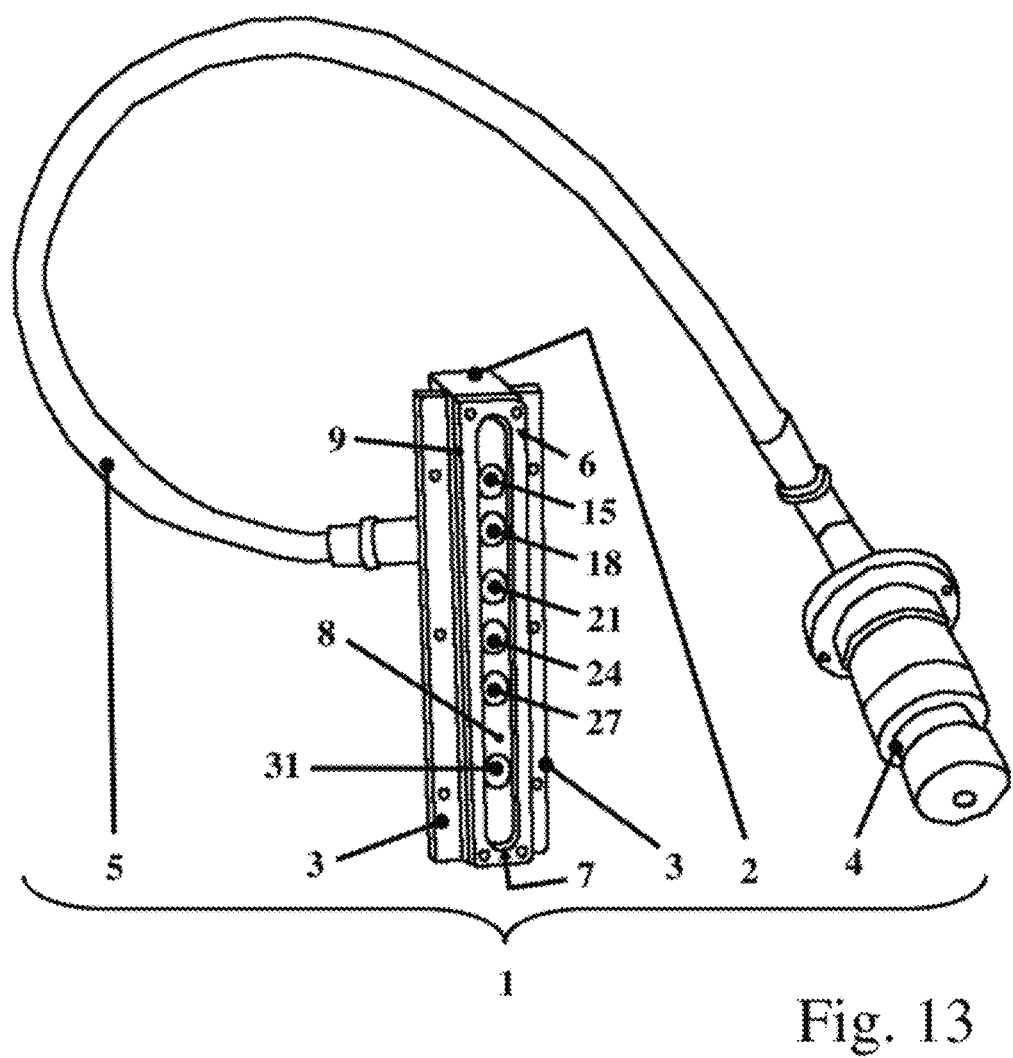
FIG. 13 is a view of the sensor of FIG. 7 according to a different point of view.
Figure 14:
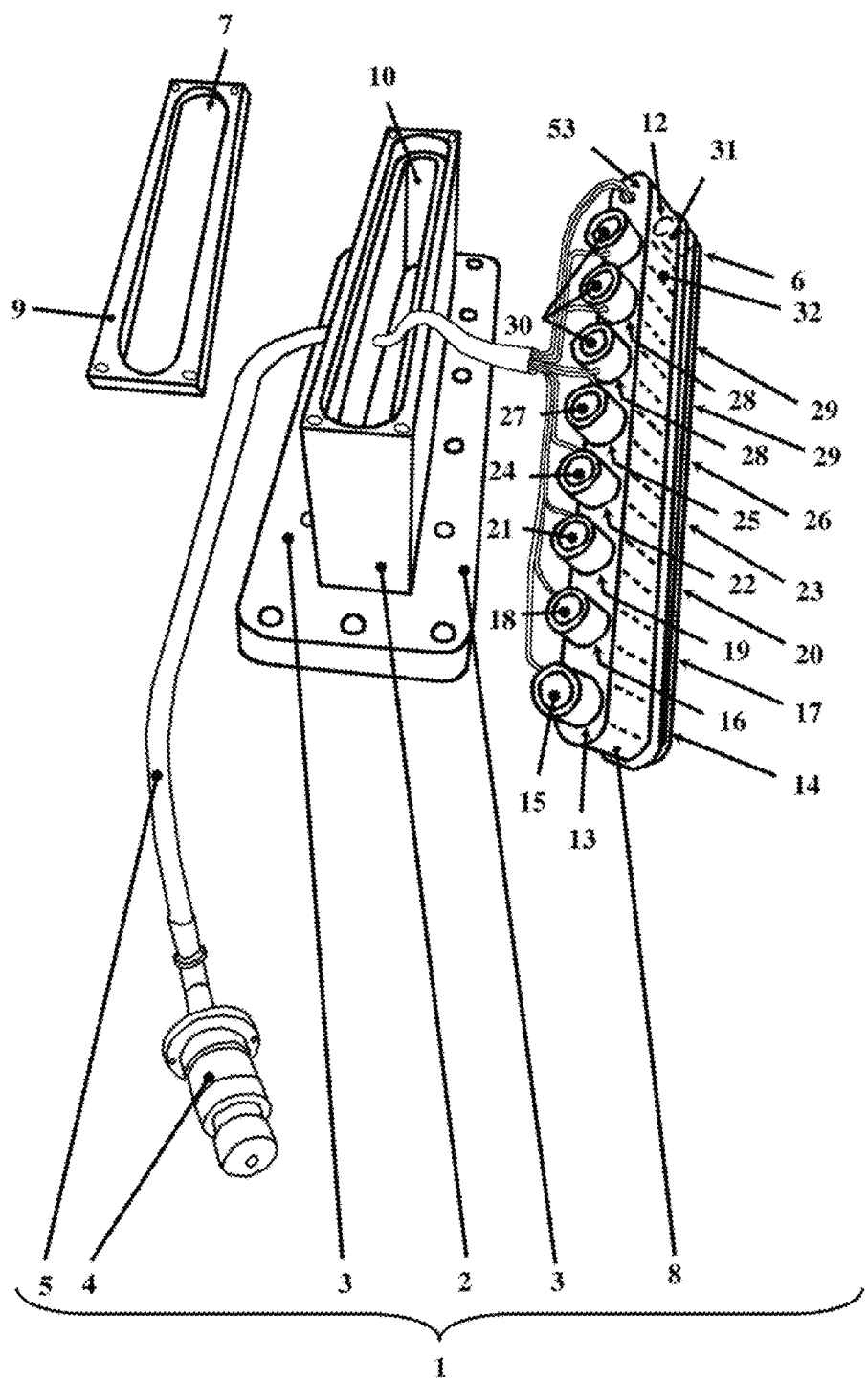
FIG. 14 is an exploded perspective view of an embodiment of the inventive sensor.
Figure 15:
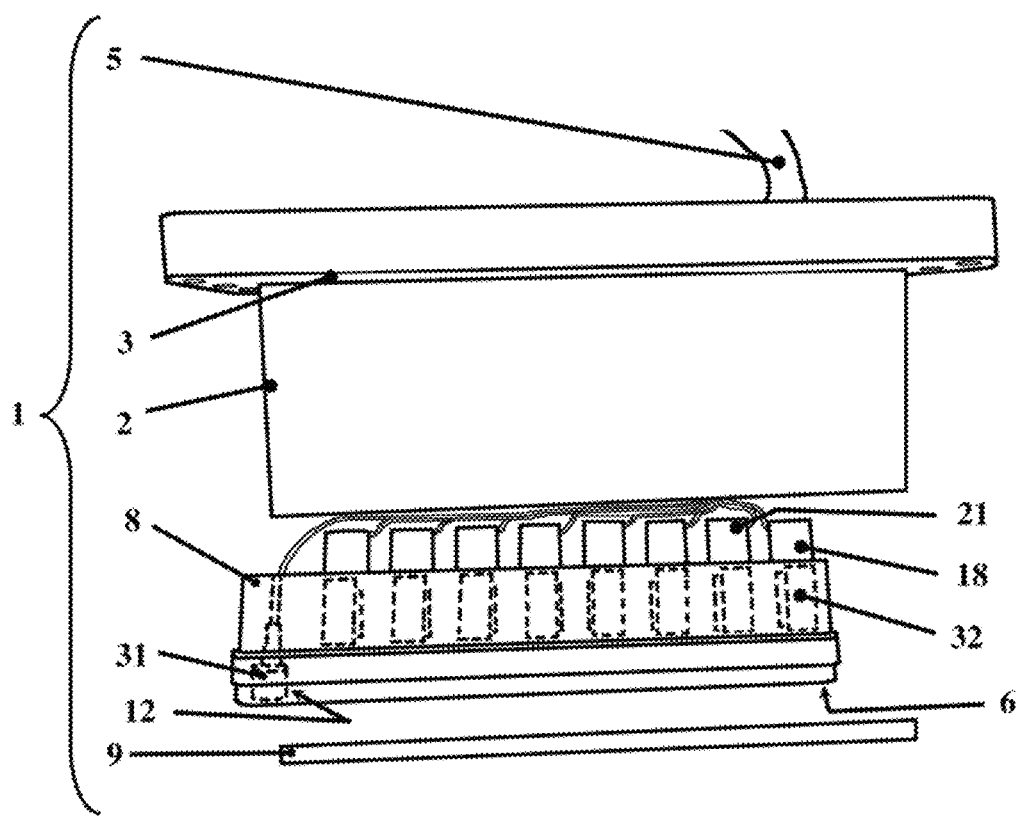
FIG. 15 is an exploded perspective view of an embodiment of the inventive sensor.

In general, the sensor (1) contains within it all the elements necessary for the generation and reception of the ultrasonic elastic waves, the sensor (1) may include (FIG. 7, FIG. 13) a case (2), for example made of stainless steel, which is provided with fixing means (3) to facilitate its assembly in the measuring region. For example, the fixing means (3) can be made (FIG. 5, FIG. 6, FIG. 7, FIG. 13, FIG. 14, FIG. 15) in the form of a pair of fixing tongues provided with holes for the passage of screws. For example (FIG. 1, FIG. 2, FIG. 3, FIG. 4, FIG. 11), the sensor (1) can be mounted inside the mould (34) on a conveyor (33) of a mould (34) and in particular the sensor (1) can be mounted in such a way as to replace a portion of the conveyor (33) itself obtaining (FIG. 5) a housing (43) in the conveyor (33). With this solution it will be possible to have the sensor (1) mounted in a condition of essential parallelism with respect to the crystallizer (35), within which the ultrasonic elastic waves must be transmitted. More in detail, the sensor (1) is spaced with respect to the crystallizer by a distance which is essentially equal to the spacing (36) which separates the conveyor (33) from the crystallizer (35). The sensor (1) is further equipped (FIG. 7) with an exit (11) for the passage of the electrical connections which will be contained in a cable (5) provided with a connector (4) at its end for connection to the electronic equipment for power supply, signal pre-processing, communication with processing and regulation systems. The case (2) includes a detection face (6). In the event that the case is made of a material not suitable for the efficient transmission of the ultrasonic elastic waves, the detection face (6), i.e. the face of the sensor (1) through which transmission and reception takes place of the ultrasonic elastic waves, is provided with a slit or passage holes which are closed by a cover (8) made of a material suitable for the efficient transmission of the ultrasonic elastic waves, in which a material suitable for the efficient transmission of the ultrasonic elastic waves means a material having an acoustic impedance of the order of the one of water. For example, a plastic or polymeric material can be used having an acoustic impedance similar to the one of water. In general, materials with an acoustic impedance of 3+/−2 MRayl are suitable. "MRayl" is a unit of measurement of acoustic impedance such that 1 MRayl is equal to 10 to the sixth kilograms per square meter per second. An example of a suitable material is the product known with the trade name Rexolite™. In the illustrated embodiment, the detection face (6) consists of a closure plate (9) fixed to the case (2) by means of screws and the slit (7) or passage holes for applying the cover or covers (8) are obtained on this closing plate (9). It will be evident, however, that other embodiments without the closing plate (9) or using fixing means other than screws will also be possible. Inside the case (2) a watertight chamber (10) is thus obtained (FIG. 11) suitable for housing the ultrasonic elements (15, 18, 21, 24, 27) as well as electronic components for controlling them, for example installed on one or more special electronic boards. For example, for applications within a mould (34) in conditions of exposure to the flow of cooling fluid (44), it can be provided that the case (2) allows to obtain a sealing level for a pressure of at least 10 bars.

According to the form described (FIG. 11), therefore, the direct elastic wave (40), generated by a corresponding ultrasonic element (15, 18, 21, 24, 27), passes through in the following order the support (8), the water present in the spacing (36), the thickness of the crystallizer up to the external wall where a reflection occurs with the generation of a reflected wave (41), which passes through in the following order the thickness of the crystallizer up to the internal wall, the water present in the spacing (36) and the support (8) to be picked up by the corresponding ultrasonic element (15, 18, 21, 24, 27).

For optimal detection, the following rules should be observed:

thickness of the spacing (36), i.e. crossing space in water, substantially equal to and preferably not less than the thickness of the crystallizer (35) made of copper or copper alloy;

thickness of the support (8) equal to a multiple k of the thickness of the spacing (36), that is, the crossing space in water.

In the case of a material having an acoustic impedance of about 2.5 MRayl, such as, for example, in the case of the material known with the trade name Rexolite™, k is about 1.5. If these rules are respected, there is a temporal overlap between the waves of rebounds due to the thickness of the water and the waves of rebounds due to the support, minimizing the disturbance on the signal which should be instead measured more precisely, which are the waves reflected in correspondence with the hot wall or internal wall (48) of the mould (34). Indeed, the waves reflected in correspondence with the hot wall or internal wall (48) are thus temporally arranged between peaks due to the waves of rebounds due to the thickness of the water and the support, thus avoiding an overlap with the signal of greatest interest for measurement.

With reference to the type of ultrasonic element (15, 18, 21, 24, 27), the use of a piezoelectric transducer of ceramic type is provided and it is envisaged to operate in an ultrasonic frequency range between 1 and 10 MHz. Higher frequencies are considerably attenuated by the crystallizer made of copper or copper alloys, while lower frequencies produce packets of elastic waves which are not very temporally localized, considerably increasing the uncertainty of the measurement. This preferential type of construction allows easy installation in continuous casting moulds both with conveyors for containing the cooling water, and with copper plates provided with channels for the passage of water. Experimental tests have given excellent results with operating frequencies of ultrasonic elastic waves approximately between 1 and 10 Mhz, ultrasonic elastic waves with frequencies between 4 and 5 MHz being more preferred. Increasing the frequency causes a greater attenuation of the wave which propagates in the crystallizer. Decreasing the frequency causes a worsening of the temporal resolution.

In general (FIG. 11), a sensor (1) is provided with a certain number N of ultrasonic elements (15, 18, 21, 24, 27), preferably arranged one after the other and equally spaced from each other. The arrangement of the ultrasonic elements (15, 18, 21, 24, 27) may be an arrangement in which the elements are reciprocally aligned and arranged along a direction corresponding to a development direction in height of the sensor (1). However, as previously explained, matrix arrangements will be possible with several columns of ultrasonic elements (15, 18, 21, 24, 27), in which the columns are reciprocally parallel, this solution being especially useful for thermal mapping applications. In the case of a single series of transducers, they can be arranged both in a horizontal reciprocal alignment direction, and in a vertical reciprocal alignment direction, the terms horizontal and vertical being with reference to the direction of gravity (50). A connection cable (5) provided with connector (4) allows the connection of the sensor (1) with a signal acquisition and processing unit (51), which communicates via a communication channel with a control unit (52) of the automation of the casting machine and of the mould, which, among other things, is also responsible for generating the automation control signals for maintaining the level (39) in the position provided by the process, on the basis of the position measurements of the level obtained by means of the sensor (1).

The sensor (1) is aimed at a variety of uses:
  measurement of the temperatures of the crystallizer (35) made of copper or copper alloys, from which it is possible to obtain the measurement of the thermal profile in the mould in real time, the knowledge of which for each type of mould and in conditions of normal operation, is an important novelty for the possibility of extracting valuable information on the quality of the continuous casting process;
  measurement of the position of the level (39) within the mould, measurement obtained starting from the measurement of the thermal profile. The measurement of the position of the level (39), in turn, allows two actions which are the control of the steel flow into or out with respect to the mould (34) and the continuous casting machine and, furthermore, the control of the thickness of the protective powder of the steel meniscus at the position of the level (39). By placing a second sensor sensitive to the amount of powder next to the device (for example the radioactive sensor or an optical sensor which measures the distance of the upper surface of the powder with respect to the upper end of the copper) it is possible to extract an estimate of the thickness of the powder and, therefore, to adjust the automatic entry flow of the cover powder dispenser.
  identification of anomalous phenomena, such as sticking, to prevent breakout, these identifications being obtained from the analysis of the measured thermal profile.

With reference to the measurement of the temperatures of the crystallizer (35), as regards the moulds (34) made of copper or copper alloys shaped like a tube provided with a conveyor (33) for the cooling water, there is no device for thermal control distributed used as a normal process control element. In case it is necessary to measure the thermal state of the mould, it is necessary to carry out complex and expensive installations of thermocouples, which are rarely done for this reason. In the case of plate moulds (for example slabs) there are standard installations of thermocouples for thermal monitoring. However, due to cost and installation complexity, the distance between thermocouples generally does not drop below 100 mm. With this device it is possible to go down to distances of about 10 mm, considerably increasing the definition of the shape of the thermal curve.

It is known that an elastic perturbation which propagates in a medium at each interface undergoes a phenomenon of refraction and by virtue of this part of the energy continues and part of the energy is reflected. The elastic perturbation which reaches the internal wall (48) of the mould (34) can be in two distinct conditions given by the presence of steel in correspondence with the measurement area by means of the elastic waves and absence of steel in correspondence with the measurement area by means of the elastic waves. If there is a condition of presence of liquid steel which is solidifying, then part of the energy will be transferred into it, otherwise, due to the large difference in acoustic impedance between copper and air, all the energy will be reflected. Having defined a vertical series of injection points (FIG. 11), it is possible to estimate the position of the level by measuring the amplitudes of the rebound signals in the copper. The signals recorded by the transducers, whose positions are such as to be lower than the one of the meniscus, in addition to the attenuation due to propagation in copper, will undergo further attenuation due to the presence of steel on the internal wall (48) of the mould (34).

The inventive solution can also be used in castings other than the one of liquid steel, as long as the same substantial logic is maintained. One example is brass casting.

Preferably, the case (2) is of elongated shape, with the major axis arranged parallel to the casting direction, so as to be able to advantageously position a sufficient number of sensitive detection elements along the direction of interest for the measurement to be carried out. For example, cases with a height of about 200 mm can be provided, in such a way as to allow the sensitive detection elements to be distributed in the region concerned by the level (39).

The sensor (1) is composed (FIG. 14, FIG. 15) of the case (2), within which the chamber (10) is obtained inside which the support or cover (8) is inserted. The support or cover (8) on one side is provided with the detection face (6) which is oriented towards the outside of the chamber (10) and on the opposite side it is provided with the mounting face (53) supporting the ultrasonic elements (15, 18, 21, 24, 27, 30) which are thus inserted into the chamber (10) when the support or cover (8) is mounted for insertion into the chamber (10) itself. A closing plate (9) seals the chamber (10) closing and locking in position the support or cover (8).

With reference to the embodiment in which the sensor (1) is mounted on the conveyor (33) and is spaced with respect to the crystallizer (35), the ultrasonic elastic waves cross this spacing (36), as they are conducted (FIG. 11) through the flow of cooling fluid (44) which circulates between the conveyor (33) and the crystallizer (35). Once the ultrasonic elastic waves reach the external wall (49) of the crystallizer (35), the ultrasonic elastic waves penetrate the crystallizer (35) and are reflected on the internal wall (48) of the crystallizer (35) itself, then causing a series of multiple reflections which propagate within the thickness of the crystallizer. Since the arrangement of the sensor (1) is such that the transmission direction of the elastic waves is orthogonal, preferably within an angle of between 90 degrees+/−0.3 degrees, with respect to the walls (48, 49) of the crystallizer, the reflection of the elastic waves occurs with the same transmission direction and the same ultrasonic element is used alternatively for the generation of the direct wave (40) and for the reception of one or more reflection waves (41), possibly some of these waves being due to the presence of reflection waves generated in turn by phenomena of generation of counter-reflected waves (42). Consequently, the ultrasonic device receives the ultrasonic elastic wave transmitted by the same ultrasonic device in a previous time, after the ultrasonic elastic wave has crossed the thickness of the crystallizer (35) and possibly, if present with respect to the type of installation of the detection system, the spacing (36) between conveyor (33) and crystallizer (35). Furthermore, it receives additional ultrasonic elastic waves which are due to counter-reflections and which have crossed the thickness of the crystallizer for a greater number of times. The echoes of the transmission ultrasonic waves (40) received by the sensor, therefore, include waves reflected in correspondence with an external wall (49) of the crystallizer and waves reflected in correspondence with an internal wall (48) of the crystallizer generated by counter-reflected ultrasonic waves (42) within the crystallizer (35).

In the inventive solution, therefore, the sensor is configured in such a way that the ultrasonic waves are transmitted orthogonally or essentially orthogonally with respect to the wall of the crystallizer which is positioned frontally with respect to the sensor itself. The sensor is therefore mounted in a condition in which the ultrasonic elements face the wall of the crystallizer being arranged on a plane which is parallel to the wall of the crystallizer. The ultrasonic waves involved travel on a plane which is orthogonal to the wall of the crystallizer, that is orthogonally orthogonal to the direction of extraction of the steel from the mould. Advantageously, holes made in the crystallizer are not necessary to realize the reflections of the transmitted ultrasonic waves, but the reflections take place at the material variation interfaces such as the interface between water and the external wall (49) of the crystallizer (35) or the interface between the internal wall (48) of the crystallizer (35) and the steel contained in the crystallizer.

The cover (8), as previously explained, is made of a material suitable for the efficient transmission of the ultrasonic elastic waves. The cover (8) consists of a worked body. The ultrasonic elements (15, 18, 21, 24, 27, 30) are applied (FIG. 14) on a mounting face (53) of the cover (8). The ultrasonic elements (15, 18, 21, 24, 27, 30) can be applied in corresponding insertion seats obtained on the body of the cover (8) or they can be applied directly to the corresponding surface of the cover without involving specific insertion seats, so that the emission of the waves occurs in an orthogonal direction with respect to the mounting face (53) of the cover (8). Each ultrasonic element (15, 18, 21, 24, 27, 30) is associated with a corresponding first support surface (13, 16, 19, 22, 25, 28) of the cover (8). Each ultrasonic element (15, 18, 21, 24, 27, 30) is caused to adhere on the first corresponding support surface, preferably with the application of a pasty material which favours the acoustic coupling between the ultrasonic element (15, 18, 21, 24, 27, 30) and cover (8). Consequently:

- the first ultrasonic element (15) is in a resting condition against the corresponding first support surface (13) which is opposite with respect to a corresponding first crossing surface (14) on the detection face (6), according to a configuration in which support surface and crossing surface are reciprocally parallel and aligned;
- the second ultrasonic element (18) is in a resting condition against the corresponding second support surface (16) which is opposite with respect to a corresponding second crossing surface (17) on the detection face (6), according to a configuration in which support surface and crossing surface are reciprocally parallel and aligned;
- the third ultrasonic element (21) is in a resting condition against the corresponding third support surface (19) which is opposite with respect to a corresponding third crossing surface (20) on the detection face (6), according to a configuration in which support surface and crossing surface are reciprocally parallel and aligned;
- the fourth ultrasonic element (24) is in a resting condition against the corresponding fourth supporting surface (22), which is opposite with respect to a corresponding fourth crossing surface (23) on the detection face (6), according to a configuration in which the support surface and the crossing surface are reciprocally parallel and aligned;
- the fifth ultrasonic element (27) is in a resting condition against the corresponding fifth support surface (25), which is opposite with respect to a corresponding fifth crossing surface (26) on the detection face (6), according to a configuration in which the support surface and the crossing surface are reciprocally parallel and aligned;
- additional ultrasonic elements (30) are in a resting condition against the corresponding additional support surface (28) which is opposite with respect to a corresponding additional crossing surface (29) on the detection face (6), according to a configuration in which support surface and crossing surface are reciprocally parallel and aligned.

The ultrasonic elements are mounted in such a way that their sensitive or transmitting surface is in contact and parallel to the respective support surfaces.

Depending on the development in height of the sensor, one or more additional ultrasonic elements (30) or none may be present. For example, in an illustrated embodiment (FIG. 14) there are three additional ultrasonic elements (30). For example, in a different embodiment illustrated (FIG. 13) there are no additional ultrasonic elements. For example, for the application of the present invention in order to obtain a thermal mapping of the mould, solutions can be envisaged with a greater number of ultrasonic elements. Solutions with ultrasonic elements operating at different frequencies are not excluded.

The support surface (13, 16, 19, 22, 25, 28) of the ultrasonic element (15, 18, 21, 24, 27, 30) is orthogonal with respect to the walls of the crystallizer, in such a way as to direct the direct wave (40) coming out of the sensor (1) according to a propagation direction which is orthogonal with respect to the surface on which the direct wave (40) must be incident, i.e. with respect to the crystallizer wall, in correspondence with which the penetration of ultrasonic elastic waves must take place. That is to say, there is a normal incidence of the waves. The body of the cover (8) is made in correspondence with the detection face (6) which is opposite with respect to the mounting face (53) of the ultrasonic elements (15, 18, 21, 24, 27, 30) so as to ensure the reciprocal parallelism between the support surfaces (13, 16, 19, 22, 25, 28) and the corresponding crossing surfaces (14, 17, 20, 23, 26, 29) of the ultrasonic elastic waves.

In case the cover (8) is made of a polymeric material, the speed of the elastic waves may be of the order of 2500 m/s. For this application, for example, the use can be envisaged of cover materials with propagation speed of ultrasonic elastic waves between 1500 to 3500 m/s.

In one embodiment the use of optional spurious echo attenuation elements (32) is also provided (FIG. 14, FIG. 15), which are applied laterally to the cover (8) in correspondence with each ultrasonic element (15, 18, 21, 24, 27, 30). The material of the attenuation elements is preferably a polymeric material with an attenuating effect of acoustic waves by attenuating echoes from directions other than the orthogonal direction. The material of the attenuation elements is preferably provided with a surface with sawtooth ridges and recesses for the increase of the absorbing and attenuating effect. The ridges of the sawtooth conformation have a pitch of the order of magnitude of the wavelength to be attenuated. This allows to increase the absorbing effect since the reflected waves, having a random phase, add to each other in a destructive way. In practice, this element has an attenuating action, both due to the fact that the material itself is an absorbent material for elastic waves, and because the geometry reduces the amplitude of the reflected waves. The attenuation elements are (FIG. 14, FIG. 15) longitudinal elements with development in length along a direction orthogonal to the direction of development in length of the sensor (1).

Preferably, a seat (12) is also obtained within the body of the cover (8) for the application of a temperature sensor (31), which detects the temperature in the proximity of the detection face (6) where the direct waves come out of the cover (8) and where the reflected waves penetrate the cover (8), for acquisition of corrective parameters of the physical detection quantity. The temperature sensor (31) detects the temperature before starting the casting machine or starting the casting process in order to obtain an estimated temperature value of the ultrasonic elements (15, 18, 21, 24, 27, 30) to perform a calibration phase of the sensor (1) with an automatic zeroing function.

In the inventive sensor (1), each ultrasonic element (15, 18, 21, 24, 27, 30) is used both as a transmitting element and as a receiving element, thanks to the fact that the transmission takes place according to an orthogonal direction, as previously explained. In this way, for each ultrasonic element (15, 18, 21, 24, 27, 30) the ultrasonic element transmits an elastic wave which propagates orthogonally with respect to the support (8), which is in turn parallel to the crystallizer where reflected waves and return waves from counter-reflected waves are generated. The reflected waves and the return waves from the counter-reflected waves maintain the same direction of propagation in the opposite direction oriented towards the ultrasonic element, which thus receives waves relating to the signal transmitted by the ultrasonic element itself and not waves relating to the signal transmitted by other ultrasonic elements (15, 18, 21, 24, 27, 30).

Using the same ultrasonic element to transmit and receive the corresponding reflected waves is advantageous, since in this way an orthogonal incidence of the elastic waves on the crystallizer (35) is used, with the remarkably advantageous consequence that it is possible to use the same configuration of the sensor (1) for any value of the thickness of the crystallizer (35), which would not be possible in the case of non-orthogonal incidence of the elastic waves. This applies, in general, for any thickness of the crystallizer which can be confused with the operating area or range, which substantially corresponds to the distance of the spacing (36) between the detection face (6) of the cover (8) and the external wall (49) of the crystallizer (35).

Figure 16:
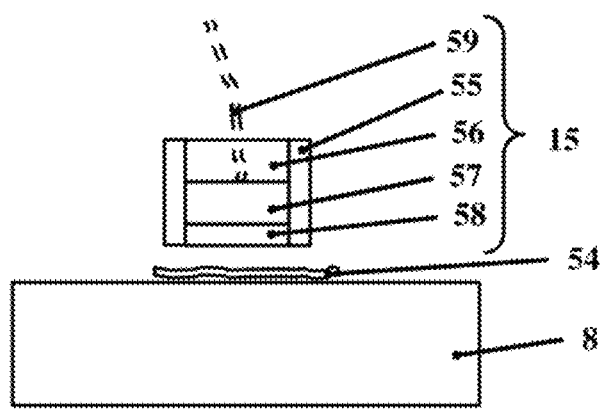
FIG. 16 schematically illustrates the structure of one of the ultrasonic elements of the inventive sensor.

With reference (FIG. 16) to the structure of the ultrasonic element (15, 18, 21, 24, 27, 30), although reference is made to the first ultrasonic element (15), it will be evident that each ultrasonic element (15, 18, 21, 24, 27, 30) has the same structure. The ultrasonic element (15, 18, 21, 24, 27, 30) is composed of a container (55) within which a sandwich structure is arranged, in which a piezoelectric transducer (57) of ceramic type is enclosed between a substrate (56) and an adaptation element (58). The adaptation element (58) constitutes the interface for fixing to the support (8), while the substrate (56) is on the opposite side of the transducer (57) with respect to the adaptation element (58). The fixing to the support (8) is done by means of an adhesive material (54). Various adhesive materials can be used such as, for example, epoxy resins. The characteristics must be such as to guarantee reliability in relation to the cyclic thermal excursions to which the sensor is inevitably subjected. The substrate (56) is composed of a mixture of resin and metal oxides which acts as an oscillation attenuation element, so as to be able to use a wider frequency band reducing the disturbances induced by the vibrations which are present. The adaptation element (58) is an acoustic impedance adapter. The substrate material must have an extension in height which preferably corresponds to a fraction of the wavelength, such as, for example, a quarter of a wavelength with reference to the wavelength of the ultrasonic waves generated. Theoretically, the material should have an acoustic impedance equal to the geometric mean of the impedance of the materials it joins, however variations are tolerated.

The electrical connection (59) of the transducer (57) is incorporated within the substrate (56) and exits from the container (55) on the opposite side with respect to the one where there is the adaptation element (58) which is fixed to the support (8).

With reference to ultrasonic elastic waves, as previously explained, the use is provided of operating frequencies approximately between 1 and 10 MHZ, ultrasonic elastic waves with frequencies between 4 and 5 MHz being more preferred. Since the ultrasonic elastic waves are transmitted orthogonally through the flow of cooling fluid (44) which circulates between the conveyor (33) and the crystallizer (35), the ultrasonic elastic waves transmitted are necessarily p-type compression waves, as the coupling with the fluid does not support the transmission of s-type shear waves.

The transmission of the direct ultrasonic elastic waves (40) occurs in a pulsed way, i.e. each ultrasonic element (15, 18, 21, 24, 27, 30) emits an excitation pulse of ultrasonic elastic waves according to a transmission direction orthogonal with respect to the crystallizer (35). The excitation pulse may have an amplitude between 50 V and 300 V, with reference to the drive voltage of the ultrasonic element (15, 18, 21, 24, 27, 30). The choice of the drive voltage depends on the type of piezoceramic material used.

The pulse can be unipolar or bipolar. The unipolar pulse has a spectrum which decreases starting from the direct component and, therefore, part of the energy is not used, because the transducer has a narrow resonance band. The bipolar pulse allows to better adapt the excitation band with the resonance band, but from the circuit point of view its implementation makes the circuit more complex than in the case of unipolar pulse.

The duration of the pulse must be compatible with the resonant frequencies of the ceramic and typically the duration of the pulse may be of the order of about 100 ns. The times of the leading and trailing edges of the pulse may be of the order of a lower order of magnitude than the duration of the pulse, approximately of the order of about 10 ns. The reflected waves (41) and the return of the counter-reflected waves (42), i.e. the return echoes of the direct waves (40) transmitted according to the pulsed mode described, are acquired within an acquisition period of about 100 microseconds starting from the moment of transmission of the pulse. The use is provided of a 1 kHz repetition frequency of the transmission pulses for the generation of the transmitted direct waves (40). With these parameters, it is possible to comply with the timing necessary for the control systems of the continuous casting process, which usually require control periods of the order of 50 ms.

For each transmission pulse for the generation of the direct waves (40) transmitted, the acquisition (FIG. 12) is provided of two or more return echoes relative to elastic waves which have passed through the crystallizer (35).

Although the ultrasonic elements (15, 18, 21, 24, 27, 30) could be all driven in transmission at the same time, it is preferable more convenient to use a multiplexer (60), in such a way as to have a single pulse generation electronics and a single pre-processing electronics for the pulses received. In this way, a single pulse generation electronics is alternately connected via the multiplexer (60) to each ultrasonic element (15, 18, 21, 24, 27, 30) while the same ultrasonic element (15, 18, 21, 24, 27, 30) is connected to the single pre-processing electronics of the pulses received for receiving the return echoes from the crystallizer (35). The multiplexer (60) can be integrated within the sensor itself or it can be positioned at the local processing unit (51) or in a local electronic board contained in a junction box.

In particular, an ultrasonic element receives (FIG. 12) the first reflected ultrasonic elastic waves (41) after a time Dt1 equal to the sum of:

TP1: flight time of the direct ultrasonic elastic waves (40) in the cover (8);
TL1: time of flight of the direct ultrasonic elastic waves (40) in the spacing (36) with the flow of cooling fluid (44), in the case in which the spacing (36) is present;
TC1: time of flight within the thickness of the crystallizer (35) of the direct ultrasonic elastic waves (40) transmitted in the crystallizer;
TC2: time of flight within the thickness of the crystallizer (35) of the reflected ultrasonic elastic waves (41), which is equal to TC1;
TL2: time of flight of the reflected ultrasonic elastic waves (41) in the spacing (36) with the flow of cooling fluid (44), in the case in which the spacing (36) which is equal to TL1 is present;
TP2: time of flight of the reflected ultrasonic elastic waves (41) in the cover (8), which is equal to TP1.

Furthermore, an ultrasonic element receives (FIG. 12) the second reflected ultrasonic elastic waves (41) due to the propagation of the counter-reflected ultrasonic waves (42) after a time Dt2 equal to the sum of:

TP1: time of flight of the direct ultrasonic elastic waves (40) in the cover (8);
TL1: time of flight of the direct ultrasonic elastic waves (40) in the spacing (36) with the flow of cooling fluid (44), in the case in which the spacing (36) is present;
TC1: time of flight within the thickness of the crystallizer (35) of the direct ultrasonic elastic waves (40) transmitted in the crystallizer;
TC2: time of flight within the thickness of the crystallizer (35) of the reflected ultrasonic elastic waves (41), which is equal to TC1;
TC3: time of flight within the thickness of the crystallizer (35) of the counter-reflected ultrasonic elastic waves (42) moving towards the internal wall (48), which is equal to TC1;
TC4: time of flight within the thickness of the crystallizer (35) of the counter-reflected ultrasonic elastic waves (42) moving towards the external wall (49), which is equal to TC1;
TL3: time of flight of the counter-reflected ultrasonic elastic waves (42) in the spacing (36) with the flow of cooling fluid (44), in the case in which the spacing (36) which is equal to TL1 is present;
TP3: time of flight of the counter-reflected ultrasonic elastic waves (42) in the cover (8), which is equal to TP1.

Since, as previously explained, the speed of sound propagation depends on the temperature, which, in turn, depends on the position of the level (39) of the liquid metal contained in the crystallizer, the times TC1 and TC2 depend on the position of the level (39) of the liquid metal contained in the crystallizer and it is therefore possible, by measuring the overall time between transmission and reception, to obtain a measurement of the position of the level (39).

Since the measurement is based on the principle of time of flight employed by the ultrasonic elastic waves in the mould, it is important that the ultrasonic elements (15, 18, 21, 24, 27, 30) generate a corresponding direct wave (40) to a temporally localized signal, i.e. with a short time extension and few periods, ideally a wave characterized by a single wave period, maximum two wave periods. Indeed, a signal which is not very temporally localized, that is including numerous wave periods, makes the determination very complicated of the time instant corresponding to the detection of the reflected wave, thus increasing the error in estimating the position of the level or of the temperature, depending on the application of the system. The characteristic of temporally localized signal with reference to the direct wave (40) generated by the ultrasonic elements (15, 18, 21, 24, 27, 30) can be obtained when the system as a whole is associated with a high bandwidth, which is advantageously obtained thanks (FIG. 16) to the presence of the substrate (56) which has the function of an oscillation attenuation element to prevent the onset of direct waves (40) consisting of signals which are not very localized in time.

This is also necessary to allow adequate recognition of return echoes. Considering, by way of example, an ultrasonic elastic wave generation pulse with an amplitude of 100 V, the first echo received may have an amplitude between some mV and some tens of mV and it is therefore very important to have distinct and well-defined reflection waves.

For the correct functioning of the measurement, at least two return echoes are necessary after the crossing in the copper. Indeed, from their time difference it is possible to derive the estimate of the copper temperature and, using an interpolation technique between measurements at different points through the different ultrasonic elements (15, 18, 21, 24, 27, 30) arranged vertically, to trace the level position through (FIG. 10) the curve which represents the temperature profile in the copper of the crystallizer of a mould into which molten steel is cast as a function of the distance from the edge of the mould.

With an appropriate digital sampling and an adequate mathematical treatment of the signal it is possible to reach the resolution of one nanosecond. The greater the temporal distance between the peaks of the detected echoes, the smaller the relative error will be. In order to improve accuracy, therefore, in some embodiments the use is provided of combinations of different echoes, such as for example the first echo received and the third echo received, or the first echo received and the fourth echo received. However, the amplitude of the signals received, that is the amplitude of the peaks of the successive echoes gradually received as a result of the counter-reflections, undergoes a progressive reduction due to the attenuation and this limits the use of echoes due to multiple counter-reflections.

With reference to the temperature measurement, accuracies of the order of one degree can be achieved.

In order to estimate the level starting from the temperature measurement obtained from the acquisition of time delays, the following procedure can be used:

having defined (FIG. 10) as "Z" the distance from the top of the crystallizer, the corresponding measurement of temperature is associated with the position of each ultrasonic element (15, 18, 21, 24, 27, 30) along the Z axis;

an interpolation of the measurements thus obtained is performed, for example by cubic interpolation, obtaining an interpolated curve;

once the interpolated curve representative of the acquired measurements is obtained, the ZMax coordinate corresponding to the maximum point of the interpolated curve is determined;

the position of the level is obtained by adding a corrective offset value to obtain the measurement of the position of the ZL level.

The corrective offset value is a calibration value which depends on the type of steel which can be obtained through process tables, also depending on the type of casting machine and mould.

Considering an illustrative example based on a typical configuration of what happens in the mould (FIG. 12), the following definitions should be considered according to which t1 indicates the time of arrival at the receiver of the first reflection of the copper wall exposed to the steel and t2 indicates the time of arrival at the receiver of the second reflection of the copper wall exposed to the steel.

On the basis of the travel times in the various parts of the mould (FIG. 12) we have:

$$t1 = 2(TP1 + TL1 + TC1)$$

$$t2 = 2(TP1 + TL1 + TC1 + TC3)$$

Since the propagation time of the elastic wave depends on the copper temperature, we have $t2-t1 = 2TC3 = 2TC1 = 2TC2 = f(T)$, where $f(T)$ indicates a function of the temperature in the copper. Finding, therefore, the functional relationship which links time to temperature, a measurement is obtained, by inversion, of the temperature obtained starting from the experimental measurement of time. The temperature inside the copper during the casting phase is not homogeneous and has gradients. However, it can be verified that, since the temperature decay between the hot side and the cold side is substantially linear inside the copper, the functional relationship $t2-t1=f(T)$ can be effectively approximated with $t2-t1=f(averageT)$, where averageT represents the average temperature inside the copper itself. From the knowledge of the curve $f(T)$, which is known experimentally, it is therefore possible to determine, starting from the measurement of the times t1 and t2, the temperature of the copper and, from this, the position of the steel level within the mould.

In order to obtain the required measurements, i.e. firstly the measurement of the temperature of the crystallizer and, starting from this, the measurement of the position of the steel level within the mould, the use is provided of a processing method as indicated for each ultrasonic element of the sensor.

A problem which must be dealt with concerns the thickness of the crystallizer, which is not a constant parameter of the system since, even using the thickness value provided for a given configuration, it does not correspond to the real value of the crystallizer present in the mould due to the progressive consumption of the hot wall of the crystallizer and of any possible processing carried out on this wall to eliminate any possible problems of localized wear. Consequently, the thickness of the crystallizer is a parameter which is not known with certainty and greatly influences the timing of the rebounds of the elastic waves within the crystallizer.

For this purpose, a system auto-zeroing procedure is implemented. Initially, with the mould empty, that is before the start of the casting process, for each ultrasonic element of the sensor. The following are defined:

W1: represents the arrival time at the receiver of the first reflection of the wave on the cold surface of the copper, that is on the side of the crystallizer on which there is the cooling water;

W2: represents the arrival time at the receiver of the second reflection of the wave on the cold surface of the copper, that is on the side of the crystallizer on which there is the cooling water;

P1: represents the arrival time at the receiver of the first reflection on the hot surface of the copper, that is on the side of the crystallizer on which there is the molten steel;

P2: represents the arrival time at the receiver of the second reflection on the hot surface of the copper, that is on the side of the crystallizer on which there is the molten steel;

R1: represents the arrival time at the receiver of the first rebound on the surface of the cover (8), preferably of Rexolite™, exposed to water;

R2: represents the arrival time at the receiver of the second rebound on the surface of the cover (8), preferably of Rexolite™, exposed to water.

The system auto-zeroing procedure involves the following steps:

sending a pulse of direct elastic waves (40) to an injection area on the cold wall or external wall (49) of the crystallizer of the mould (34) and the return signal from the crystallizer is acquired by means of the same ultrasonic element building of a mediated signal of the return signal identification of the peak W1 identification of the peak P1 identification of a sequence of acquisition time windows, in which each window corresponds to a time interval in which the presence is expected of a return echo from the crystallizer, which is used for the subsequent temperature calculation phase selection of the acquisition time windows, in which the identified and selected windows exclude the acquisition of the peaks W1 and W2 building of an average of response times by sending a temporally spaced and disjoint sequence of pulses of direct elastic waves (40) and acquisition of a series of return echoes for each pulse of direct elastic waves (40).

The critical problem which must be dealt with in this phase concerns the identification of the windows for the analysis of the peaks and the definition of the gains of the electronic board. In fact, the general idea is that the peak W1 must have a high and possibly saturated amplitude value, while the amplitude of the peak P1 must fall within a predefined window.

In order to obtain these conditions, the electronic board dynamically modifies the gains and, at each variation in the gain of the amplifiers, the auto-zeroing cycle starts again. At the end of the procedure, intervals are established on the time axis which univocally define the time windows. The time differences between the first peak and the remaining ones are calculated, thus setting a value of zero to which the primary water temperature will be associated at that given instant. The processing procedure will extract the temporal variations with respect to this zero and convert them into temperature. It is emphasized that the time windows cannot be changed during the processing phase.

In general, it is observed (FIG. 11, FIG. 12) that the P-type wave is generated on the free surface of the Rexolite™ support or cover (8), it propagates first in the Rexolite™ support or cover (8), then in the water and finally in the crystallizer. A reflection wave is generated at each interface which can potentially disturb the measurement. In order to avoid this problem, the block of the Rexolite™ support or cover (8) is planned, so that the rebounds due to the surface of the Rexolite™ support or cover (8) with the water and those of the water with the crystallizer overlap. In this way, the time window for the analysis of the rebounds in the crystallizer is maximized. Having thus defined, as DtR, DtW and DtCu the double travel times of the wave P in the respective materials, then the plan rule of the sensor is:

$$Dt_R = Dt_W > nDt_{Cu} \quad (1)$$

"n" means an appropriate number of bounces.
From equation (1) it follows that:

$$s_R = \frac{v_R}{v_W} s_W \quad (2)$$

$V_R$ and $V_w$ indicate the speed of the waves P respectively in the Rexolite™) support (8) equal to about 2.2 mm/microseconds, and in the water equal to about 1.48 mm/microseconds. The VR I vw ratio is approximately equal to 1.5. The time taken by a rebound in the water with a thickness of 24 mm is approximately 32.5. Therefore, a point R1 corresponding to a first rebound R1 is at about 32.5 seconds while a point R2=W1 is at about 65 seconds.

Since the ultrasonic speed in copper or copper alloy, the material of which the crystallizer is usually composed, is approximately equal to 4.76 mm/microseconds, taking a thickness of the crystallizer in the measurement area of 18 mm, a single rebound takes approximately 7.5 microseconds and, therefore, in the given configuration there can be a maximum of 4 rebounds in copper. Having at least two reliable rebounds in the worst conditions is the aim of the project. The thickness of the crystallizer in a plate mould does not remain constant and can be reduced up to about 8 mm following subsequent reworking. It is thus clear from this brief analysis, that the key problem is the unknown thickness of the copper, which makes any attempt unsuccessful to isolate individual rebounds in time windows defined a priori. Having set DtCu as the measure of the temporal distance between the first (P1) and the second (P2) peak, the following is obtained by definition, $$Dt_{Cu} = \int_0^{DL} \frac{2}{v(T)} dl \quad (3)$$

DL being the thickness of the crystallizer and v(T) being the speed of the ultrasonic wave depending on the temperature. In principle, the speed changes at every single point of the copper, because there is a high thermal gradient. However, by applying the mean value theorem, it can be numerically demonstrated that the previous expression can be simplified to $$Dt_{Cu} = \frac{2DL}{v(T^*)} \approx \frac{2DL}{v(\overline{T})} \quad (4)$$

where T* is the exact value provided by the mean value theorem, while T with the upper bar represents the average temperature of the crystallizer in the area affected by the ultrasonic beam. Experimentally, moreover, it is verified that between the temperature and the speed there is a substantially linear relationship given by $$m_v \overline{T} + q_v = \frac{2 DL}{Dt_{Cu}} \quad (5)$$

mv and qv being coefficients referring to the speed variable v, where mv is the linear variation coefficient and qv is the intercept coefficient of the linear relationship.

Experimentally, the temporal distance thus changes, as a function of the temperature variation, therefore ultimately we get the following estimator, where the apex "s" indicates an estimated measure:

$$\overline{T}^s = \frac{2DL}{m_v Dt_{Cu}(T)} - \frac{q_v}{m_v} \quad (6)$$

It is now observed that also DL in principle is a function of the temperature, however its variation is negligible, therefore we can affirm that DL(T)=DL=constant. In order to simplify the writing, we define $T_0$=average temperature estimated during the auto-zeroing procedure and T=average temperature estimated during the calculation phases. Moreover, setting Dt(T)=DtCu(T), then from the previous expression the following is obtained:

$$DL_0 = \frac{Dt(T) q_v}{2} \left( 1 + \frac{m_v T_0}{q_v} \right) \quad (7)$$

By inserting equation (7) into equation (6) with the assumption of invariance of the thickness the following is obtained:

$$T = \frac{q_v}{m_v} \left( \frac{\Delta t_0}{\Delta t(T)} - 1 \right) + T_0 \frac{\Delta t_0}{\Delta t(T)} \quad (8)$$

It is noted, however, that an excellent approximation is Dt0/Dt(T) approximately equal to 1 and, therefore, ultimately, the following simplified estimator is obtained, $$T = \frac{q_v}{m_v}\left(\frac{\Delta t_0}{\Delta t(T)} - 1\right) + T_0 \quad (9)$$

which by exploiting the same approximation can be further simplified to $$T = \frac{q_v}{m_v}\frac{\Delta t_0 - \Delta t(T)}{\Delta t_0} + T_0 \quad (10)$$

The obvious advantage of equations (9) and (10) with respect to equation (6) is that it is not necessary to know the thickness of the crystallizer and this is a crucial point, because the real value of the thickness of the crystallizer is unknown, in particular following the recovery processes.

For confirming the previous hypotheses, some numerical evaluations follow. Experimentally it is observed that $q_v$ is approximately equal to 4.7 mm/microseconds and $m_v$ is approximately equal to $-5\times10^{-4}$ and consequently $q_v/m_v$ is approximately equal to 9000. Furthermore, for homogeneous temperature variations of a copper block the maximum dynamics of the process is of the order of tens of nanoseconds compared to Dt(T) approximately equal to 5 microseconds for copper thicknesses typical of the casting process.

Figure 19:
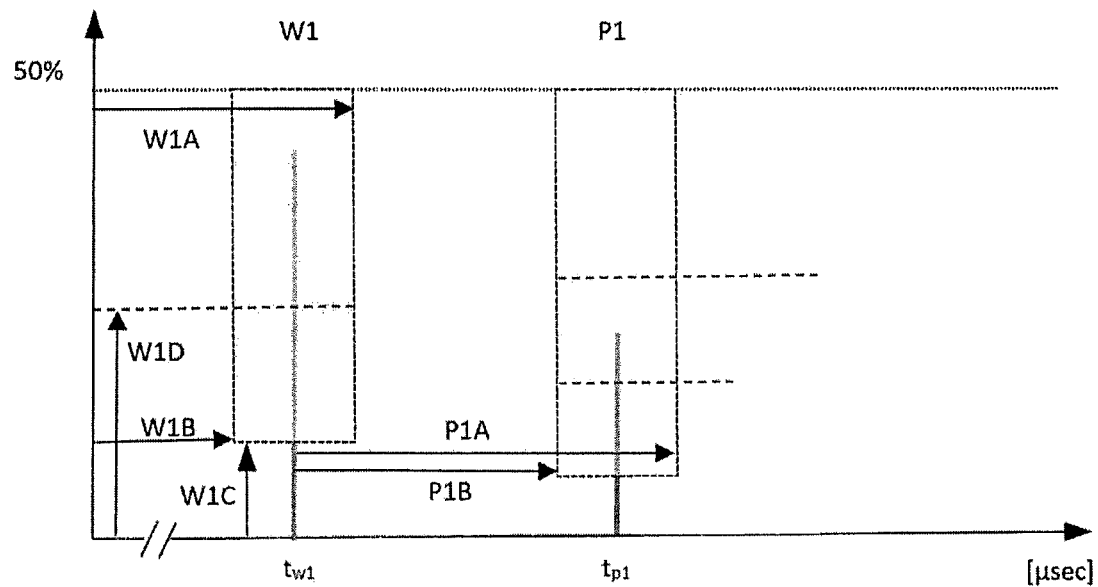
FIG. 19 schematically illustrates the situation of the elastic waves being processed.

In order to proceed with the identification of the time windows it is necessary to make sure that the signal has the correct characteristics, in particular the amplitude of the signals is very important. Indeed, it is necessary to verify that the peak P1 has a sufficiently high value, but such as not to dangerously approach saturation. A preliminary phase, therefore, provides for a correction of the gains for the peak W1, as it is certainly the most pronounced peak and its position is very well defined by construction. After identifying with certainty tw1, regardless of the thickness of the crystallizer, the peak P1 will have to be located within a certain window, between PIA and PIB (FIG. 19) with respect to tw1, since, by construction, the thickness of the crystallizer will be between a maximum and a minimum. If the value of the amplitude of P1 falls within the expected window, it is reasonable to expect that the decay of the peaks P2, P3, etc., will occur according to expectations. Referring to the figures (FIG. 19), two conditions are required to identify the time tw1 of the peak W1:

W1B less than or equal to tw1 less than or equal to W1A (condition over time);

aW1 greater than or equal to W1C (condition in amplitude).

For the automatic gain control (CAG), the further condition is set that aW1 is greater than or equal to W1D, and W1D greater than or equal to W1C. In this way it is possible to dynamically change aw1 to make it fall within expectations. In order to identify the time tp1 of the peak P1 one proceeds in the same way, although the time distances are defined with respect to tw1:

$$t_{p1}+P2B \leq t_{p1} \leq t_{p1}+P2A \quad (11)$$

$$a_{p2} \geq P2C \quad (12)$$

At this point it is possible to obtain a reasonable estimate of the distance of the echoes in the entire sequence of the crystallizer, therefore having set Δtp=tp2−tp1, for each peak other than the first (logically, the second can also be excluded) the following constraints are applied:

$$t_{pi-1}+(\Delta tp-PIA/2) \leq t_{pi} \leq t_{pi-1}+(\Delta tp+PIA/2) \quad (13)$$

$$a_{pi} \geq PIB \quad (14)$$

Figure 20:
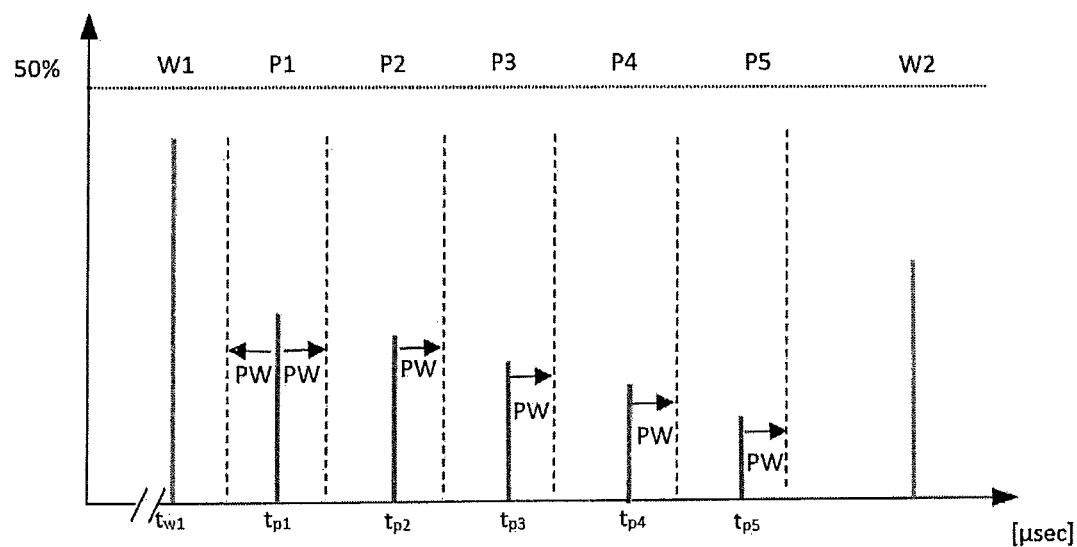
FIG. 20 schematically illustrates one of the signal processing phases.

By iterating the previous conditions up to a predetermined maximum of iterations or until the conditions are met, all the peaks of the series are obtained. Once the times of the echoes are identified, it is possible to build the time windows within which to perform the search in real time. The parameter which defines the width of these windows PW (FIG. 20) must be defined in such a way as to contain the possible absolute excursions of the peaks as a function of the temperature. It should be noted that when the casting is in operation, in addition to the crystallizer, the temperature of water and Rexolite™ also increases. Water, for example, has the opposite behaviour with respect to the one of copper.

After correctly identifying the windows, the acquisition is carried out of data to build the values of the time differences which constitute the auto-zero reference. The operations in sequence are data acquisition;

control of the rms value;

extraction of the peaks;

execution of the averages of time differences and water temperatures.

The indicated sequence is repeatedly executed for a predetermined number of iterations and the average values are calculated. Once the averages are completed, the calibration validation is carried out, which consists in verifying that all the time differences measured allow the calculation of a crystallizer thickness between the expected limits. The thickness calculation is done using the coefficients of the formula (5).

The temperature estimation phase consists in the following steps acquisition of raw data and possible average;

control of the rms value;

extraction of the peaks;

execution of the average of times and temperatures;

calculation of the copper temperature;

validation of the calculation.

The cycle is performed repeatedly to execute the control of the process.

The raw data acquired is possibly averaged. The control of the rms value and the extraction of the peaks take place as in the auto-zero procedure previously described. The absolute temperature of the copper is then calculated.

The absolute temperature is calculated using formula (9), where T0 and Δt0 mean the auto-zero values respectively of the measured water temperature and the time difference of the peaks.

In order to calculate the level, at least one pair of windows is chosen, each one containing a corresponding peak. Each window is analysed as previously described and the temperature is calculated according to the method explained. In any case, a control phase is provided to verify that the time variation of Δt with respect to the auto-zero value is within a predefined range of nanoseconds, in order to be sure that there are no errors in the acquisition or parameters of the machine outside the expected ones, corresponding to alarm situations to be reported.

Ultimately, the present invention refers to a sensor (1) for detection of at least one physical quantity selected between the temperature of at least one portion of a crystallizer (35) of a mould (34) of a casting machine and the position of a meniscus or level (39) of the liquid metal (37) within the crystallizer (35). The sensor (1) is adapted to be installed inside the mould (34), the sensor (1) including a case (2) provided with a chamber (10) including a closing cover (8), in which the cover (8) is placed at a detection face (6), the cover (8) bearing internally to the chamber (10) at least one first series of ultrasonic elements (15, 18, 21, 24, 27, 30) placed reciprocally vertically spaced according to a development direction in length of the sensor (1), which is parallel with respect to a development direction in length of walls (48, 49) of the crystallizer (35), wherein the first series of ultrasonic elements (15, 18, 21, 24, 27, 30) includes at least one first ultrasonic element (15), a second ultrasonic element (18), a third ultrasonic element (21). The term vertically refers to the direction of gravity and to the conformation of the sensor with respect to the development direction in length of the sensor. Each ultrasonic element (15, 18, 21, 24, 27, 30) is placed on the cover (8) according to an orthogonal orientation with respect to the development direction in length of the sensor (1) for orthogonal incidence of transmission ultrasonic waves (40) with orthogonal incidence with respect to the crystallizer (35), each ultrasonic element (15, 18, 21, 24, 27, 30) being alternatively configurable as a transmitter of transmission ultrasonic waves (40) and as a receiver of reception ultrasonic elastic waves, which are return ultrasonic waves from the crystallizer (35) consisting of echoes of reflected waves of the transmission ultrasonic waves (40) of the same ultrasonic element (15, 18, 21, 24, 27, 30). In some embodiments (FIG. 17), the sensor (1) includes more than one of said series of ultrasonic elements (15, 18, 21, 24, 27, 30), wherein each one of the series is placed on a parallel plane with respect to the detection face (6) and is placed on this plane spaced with respect to another adjacent series according to an orthogonal spacing direction with respect to the development direction in length of the sensor (1).

The present invention also relates (FIG. 11) to a detection system (1, 51) for detection of at least one physical quantity selected between the temperature of at least one portion of the crystallizer (35) and the position of the meniscus or level (39), wherein the detection system (1, 51) includes a sensor (1) intended to be installed inside the mould (34) and a signal acquisition and processing unit (51), which is connected to the sensor (1), wherein the sensor (1) is as previously described, the acquisition and processing unit (51) being connected to the sensor (1) for acquisition and processing of reception signals of the reception ultrasonic elastic waves. Preferably, the detection system (1, 51) includes a multiplexer (60) for alternative connection of a generator of ultrasonic pulses to one of the ultrasonic elements (15, 18, 21, 24, 27, 30). The detection system (1, 51) can include at least two sensors, which are placed at different sides of the crystallizer.

The present invention also refers to a detection method for detection of at least one physical quantity selected between the temperature of at least one portion of the crystallizer (35) and the position of the meniscus or level (39), by means of the sensor (1) previously described and installed inside the mould (34), the method comprising a measuring phase comprising the following steps:
 (a) transmission of a pulse of transmission ultrasonic waves (40) with orthogonal incidence with respect to the crystallizer (35) by means of one of the transmitting ultrasonic elements (15, 18, 21, 24, 27, 30) of the sensor;
 (b) reception and acquisition of signals corresponding to echoes of reflected waves of the transmission ultrasonic waves (40) by means of the same transmitting ultrasonic element (15, 18, 21, 24, 27, 30);
 (c) repetition of the phases (a) and (b) for a set of ultrasonic elements (15, 18, 21, 24, 27, 30) of the series of ultrasonic elements (15, 18, 21, 24, 27, 30) of the sensor (1);
 (d) processing of the signals corresponding to the echoes of the reflected waves;
 (e) calculation of at least one of the physical quantities selected between the temperature of at least one portion of a crystallizer (35) and the position of the meniscus or level (39).

The detection method includes a preliminary auto-zeroing procedure with respect to the measuring phase to render the measuring independent of the thickness of the crystallizer, the auto-zeroing procedure being a procedure which occurs before a start phase of the casting machine, the auto-zeroing procedure including the following steps:
 sending by means of at least one of the ultrasonic elements of a pulse of direct elastic waves (40) to an injection area of the crystallizer of the mould (34) and acquisition of a return signal from the crystallizer by means of the same ultrasonic element;
 building of a mediated signal of the return signal;
 identification of a first peak W1, in which W1 represents the arrival time to the corresponding ultrasonic element of a first reflection coming from a surface of the crystallizer in contact with cooling water of the crystallizer;
 identification of a second peak P1, in which P1 represents the arrival time to the corresponding ultrasonic element of a first reflection coming from a surface of the crystallizer in contact with the liquid metal;
 identification of a sequence of acquisition time windows in which each window corresponds to a time interval, in which the presence is expected of a return echo from the crystallizer;
 selection of the acquisition time windows, in which the identified and selected windows exclude the acquisition of the peaks W1 and W2 during the following measuring phase, in which W2 represents the arrival time to the corresponding ultrasonic element of a second reflection coming from the surface of the crystallizer in contact with cooling water of the crystallizer;
 building of an average of response times by sending a time-spaced and separated sequence of pulses of direct elastic waves (40) and acquisition of a series of return echoes for each pulse of direct elastic waves (40).

The detection method may include a phase of definition of electronic gain parameters, in such a way that the received peak W1 has an amplitude value in a condition of saturation or close to the saturation with respect to an acquisition electronics, the phase of definition of gain parameters being an iterative repetition phase of change in a dynamic way of the gains until the condition is obtained of saturation or close to the saturation of the value in amplitude of the received peak W1. The step relative to the calculation of at least one of the physical quantities selected between the temperature of at least one portion of a crystallizer (35) and the position of the meniscus or level (39), can include a phase of calculation of the time difference between the times of detection of the peaks received during the auto-zeroing procedure and during the measuring phase, the calculation occurring on the basis of the calculated time difference. Using the formula previously indicated with (9), the method may include a phase of calculation of the temperature of the crystallizer for at least one of the ultrasonic elements. The method may include a phase of calculation of the position of the meniscus or level (39) of said liquid metal (37) inside said crystallizer (35), in which the phase of calculation of the position of the meniscus or level (39) includes a phase of calculation of the temperature of the crystallizer with at least three ultrasonic elements with obtainment of calculation measurements of the temperature of the crystallizer in different positions along the development in height of the sensor, the phase of calculation of the position of the meniscus or level (39) including the following steps:
- interpolation of the calculation measurements of the temperature of the crystallizer, obtaining an interpolated curve;
- determination of a coordinate corresponding to the point of maximum of the interpolated curve, this coordinate being representative of the position of the level.

Finally, the present invention also refers to a casting machine provided with at least one mould (34) for casting a liquid metal (37), in which the mould is provided with a crystallizer (35), the casting machine comprising at least one element selected between the sensor (1) as previously described or the detection system (1, 51) as previously described. The casting machine can operate according to a control method comprising a detection method for detection of at least one physical quantity selected between temperature of at least one portion of the crystallizer (35) and position of a meniscus or level (39) of said liquid metal (37) inside the crystallizer (35), in which the detection method is made as described.

The description of the present invention has been made with reference to the enclosed figures in one of its preferred embodiments, but it is evident that a lot of possible changes, modifications and variations will be immediately clear to those skilled in the art in the light of the previous description. Thus, it must be underlined that the invention is not limited to the previous description, but it includes all the changes, modifications and variations in accordance with the appended claims.

NOMENCLATURE USED

With reference to the identification numbers in the enclosed figures, the following nomenclature has been used:
1. Sensor
2. Case
3. Fixing means
4. Connector
5. Cable
6. Detection face
7. Slit or holes
8. Support or cover
9. Closing plate
10. Chamber
11. Exit
12. Seat
13. First support surface
14. First crossing surface
15. First ultrasonic element
16. Second support surface
17. Second crossing surface
18. Second ultrasonic element
19. Third support surface
20. Third crossing surface
21. Third ultrasonic element
22. Fourth support surface
23. Fourth crossing surface
24. Fourth ultrasonic element
25. Fifth support surface
26. Fifth crossing surface
27. Fifth ultrasonic element
28. Additional support surface
29. Additional crossing surface
30. Additional ultrasonic element
31. Temperature sensor
32. Attenuation element
33. Conveyor
34. Mould
35. Crystallizer
36. Spacing
37. Liquid metal
38. Skin
39. Level
40. Direct wave or transmission wave
41. Reflected wave
42. Counter-reflected wave
43. Housing
44. Water flow
45. Metal flow
46. Upper end
47. Lower end
48. Internal wall
49. External wall
50. Direction of the force of gravity
51. Processing unit
52. Control unit
53. Mounting face
54. Adhesive material
55. Container
56. Substrate
57. Transducer
58. Adaptation element
59. Electrical connection
60. Multiplexer

The invention claimed is:

1. A system for detection of at least one physical quantity, the at least one physical quantity being either a temperature of at least one portion of a crystallizer of a mould of a liquid metal casting machine or a position of a meniscus or level of liquid metal within the crystallizer, the system comprising:
 a sensor adapted to be installed within the mould, said sensor comprising:
  a case having a chamber therein;
  a closing cover positioned at a detection face of the chamber, said closing cover bearing internally of said case cover;
  a plurality of ultrasonic elements positioned in vertically spaced relation along a length of said sensor, the length of said sensor being parallel to a length dimension of walls of the crystallizer, said plurality of ultrasonic elements comprising:
   a first ultrasonic element;
   a second ultrasonic element;
   a third ultrasonic element, wherein each of said first ultrasonic element and said second ultrasonic element and said third ultrasonic element are positioned orthogonally to the length of said sensor such that said first ultrasonic element and said second ultrasonic element and said third ultrasonic element transmit ultrasonic waves orthogonally with respect to the crystallizer and receive ultrasonic waves returned from the crystallizer, the ultrasonic waves returned from the crystallizer being respective echoes of the transmitted ultrasonic waves of said first ultrasonic element and said second ultrasonic element and said third ultrasonic element; and a plurality of attenuation elements positioned sideways with respect to said closing cover in relation to each of said first ultrasonic element and said second ultrasonic element and said third ultrasonic element so as to attenuate the respective echoes from a non-orthogonal direction, said plurality of attenuation elements being longitudinal elements positioned orthogonally with respect to the length of said sensor, wherein said plurality of attenuation elements have sawtooth ridges and recesses adapted to increase absorption and attenuation.

2. The system of claim 1, wherein the sawtooth ridges have a pitch corresponding to an order of magnitude of a wavelength to be attenuated.

3. The system of claim 1, wherein said closing cover is formed of a material transmissible of ultrasonic elastic waves.

4. The system of claim 1, wherein each of said first ultrasonic element and said second ultrasonic element and said third ultrasonic element has a container having a sandwich structure therein, the sandwich structure comprising:

an ultrasonic piezoelectric transducer;

a substrate; and an adaption element being a fixing interface of said closing cover, said substrate positioned at a side of said ultrasonic piezoelectric transducer opposite said adaption element, wherein the adaption element is an acoustic impedance adapter.

5. The system of claim 4, wherein said substrate is formed of a mixture of a resin and a metal oxide, said substrate adapted to dampen oscillations.

6. The system of claim 4, wherein said substrate has a thickness corresponding to a portion of a wavelength of the transmittal ultrasonic waves.

7. The system of claim 4, wherein said substrate has a thickness corresponding to a quarter of a wavelength of the transmitted ultrasonic waves.

8. The system of claim 1, wherein said closing cover has a seat on an interior thereof, the seat corresponding to the detection face, said sensor further comprising:

a temperature sensor housed in the seat, said temperature sensor adapted to sense a temperature adjacent to the detection face.

9. The system of claim 1, further comprising:

a plurality of series of said first ultrasonic element and said second ultrasonic element and said third ultrasonic element, each series of said plurality of series being positioned on a plane parallel to the detection face, each series of said plurality of series being in spaced parallel planar relationship orthogonal to the length of said sensor.

\* \* \* \* \*